US012705768B2

(12) United States Patent
Ingle et al.

(10) Patent No.: US 12,705,768 B2
(45) Date of Patent: Aug. 11, 2026

(54) SYSTEMS, METHODS, AND MEDIA FOR ESTIMATING A DEPTH AND ORIENTATION OF A PORTION OF A SCENE USING A SINGLE-PHOTON DETECTOR AND DIFFUSE LIGHT SOURCE

(71) Applicant: WISCONSIN ALUMNI RESEARCH FOUNDATION, Madison, WI (US)

(72) Inventors: Atul Ingle, Madison, WI (US); Sacha Jungerman, Madison, WI (US); Yin Li, Madison, WI (US); Mohit Gupta, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 735 days.

(21) Appl. No.: 17/983,925

(22) Filed: Nov. 9, 2022

(65) Prior Publication Data

US 2024/0161319 A1 May 16, 2024

(51) Int. Cl.
*G06T 7/521* (2017.01)
*G01S 7/4865* (2020.01)
(Continued)

(52) U.S. Cl.
CPC ............ *G06T 7/521* (2017.01); *G01S 7/4865* (2013.01); *G01S 17/10* (2013.01); *G06T 7/13* (2017.01);
(Continued)

(58) Field of Classification Search
None
See application file for complete search history.

(56) References Cited

U.S. PATENT DOCUMENTS

2010/0214537 A1* 8/2010 Thomas ............... H04N 13/351 353/7
2013/0088597 A1* 4/2013 Kadoch ................. G06V 20/56 348/148
(Continued)

OTHER PUBLICATIONS

Alhashim, I., Wonka, P.: High Quality Monocular Depth Estimation via Transfer Learning. arXiv:1812.11941 [cs] (Mar. 2019), http://arxiv.org/abs/1812.11941 [arxiv.org], arXiv: 1812.11941 version: 2 4, 12.

(Continued)

*Primary Examiner* — Ricky Chin
(74) *Attorney, Agent, or Firm* — Andrus Intellectual Property Law, LLP

(57) ABSTRACT

In accordance with some embodiments, systems, methods, and media for estimating a depth and orientation of a portion of a scene using a single-photon detector and diffuse light source are provided. In some embodiments, a system comprises: a light source; an image sensor comprising a pixel having a field of view of at least one degree; a hardware processor programmed to: cause the light source to emit a sequence of n defocused pulses toward the scene; receive, from the pixel, information indicative of arrival times of light from the scene; generate a transient histogram using the information indicative of arrival times of light from the scene; and estimate one or more properties of a portion of the scene within the field of view of the pixel based on the transient histogram, wherein the one or more properties of the portion of the scene includes at least a depth.

17 Claims, 14 Drawing Sheets

| Grid Size | Method | $\delta < 1.05^1 \uparrow$ | $\delta < 1.05^2 \uparrow$ | $\delta < 1.05^3 \uparrow$ | $\delta < 1.25^1 \uparrow$ | $\delta < 1.25^2 \uparrow$ | $\delta < 1.25^3 \uparrow$ | $Log_{10} \downarrow$ | $AbsRel \downarrow$ | $RMSE \downarrow$ |
|---|---|---|---|---|---|---|---|---|---|---|
| 4 × 3 | Described | 0.335 | 0.577 | 0.724 | 0.845 | 0.953 | 0.981 | 0.068 | 0.126 | 0.604 |
| | Baseline | 0.340 | 0.569 | 0.709 | 0.824 | 0.934 | 0.967 | 0.171 | 0.147 | 0.652 |
| | Bilinear | 0.285 | 0.466 | 0.588 | 0.715 | 0.886 | 0.951 | 0.083 | 0.169 | 0.856 |
| 20 × 15 | Described | 0.624 | 0.809 | 0.880 | 0.929 | 0.976 | 0.989 | 0.060 | 0.073 | 0.409 |
| | Baseline | 0.576 | 0.786 | 0.867 | 0.923 | 0.973 | 0.988 | 0.066 | 0.084 | 0.450 |
| | Bilinear | 0.583 | 0.763 | 0.840 | 0.899 | 0.963 | 0.985 | 0.038 | 0.081 | 0.498 |
| | Described Refined | 0.707 | 0.865 | 0.924 | 0.961 | 0.998 | 0.996 | 0.024 | 0.053 | 0.287 |
| MDE | DORN | 0.394 | 0.602 | 0.731 | 0.846 | 0.954 | 0.983 | 0.053 | 0.120 | 0.501 |
| | DenseDepth | 0.311 | 0.548 | 0.706 | 0.847 | 0.973 | 0.994 | 0.053 | 0.123 | 0.461 |
| | BTS-DenseNet | 0.357 | 0.607 | 0.764 | 0.885 | 0.978 | 0.994 | 0.047 | 0.110 | 0.392 |
| | DPT | 0.326 | 0.595 | 0.767 | 0.904 | 0.988 | 0.998 | 0.045 | 0.109 | 0.357 |

(51) Int. Cl.
*G01S 17/10* (2020.01)
*G06T 7/13* (2017.01)
*H04N 23/56* (2023.01)

(52) U.S. Cl.
CPC ... *H04N 23/56* (2023.01); *G06T 2207/10028* (2013.01)

(56) References Cited

U.S. PATENT DOCUMENTS

| | | | | |
|---|---|---|---|---|
| 2016/0048973 | A1* | 2/2016 | Takenaka | H04N 25/41 382/199 |
| 2017/0176575 | A1* | 6/2017 | Smits | G01S 7/4808 |
| 2018/0239021 | A1* | 8/2018 | Akselrod | H04N 23/54 |
| 2019/0346537 | A1* | 11/2019 | Krelboim | G01S 17/18 |
| 2020/0284907 | A1* | 9/2020 | Gupta | G01S 7/4868 |
| 2020/0355499 | A1* | 11/2020 | Hinderling | G01C 1/04 |
| 2020/0386893 | A1* | 12/2020 | Gupta | G01J 1/4204 |
| 2021/0055389 | A1* | 2/2021 | Mordechai | G01S 17/931 |
| 2021/0231805 | A1* | 7/2021 | Dehlinger | G01S 7/4863 |
| 2022/0051427 | A1* | 2/2022 | Nims | G01S 17/894 |
| 2023/0204731 | A1* | 6/2023 | Park | G01S 17/42 356/5.01 |
| 2024/0046410 | A1* | 2/2024 | Wicks | G06T 5/70 |
| 2024/0125931 | A1* | 4/2024 | Sakaguchi | H10F 30/225 |
| 2024/0161319 | A1* | 5/2024 | Ingle | H04N 23/56 |

OTHER PUBLICATIONS

Callenberg, C., Shi, Z., Heide, F., Hullin, M.B.: Low-cost SPAD sensing for non-line-of-sight tracking, material classification and depth imaging. ACM Transactions on Graphics 40(4), 1-12 (Aug. 2021). https://doi.org/10.1145/3450626.3459824 [doi.org], https://dl.acm.org/doi/10.1145/3450626.3459824 4 [dl.acm.org].

Fu, H., Gong, M., Wang, C., Batmanghelich, K., Tao, D.: Deep Ordinal Regression Network for Monocular Depth Estimation. CoRR abs/1806.02446 (2018), http://arxiv.org/abs/1806.02446, eprint: 1806.02446 12.

Gupta, A., Ingle, A., Gupta, M.: Asynchronous Single-Photon 3D Imaging. In: 2019 IEEE/CVF International Conference on Computer Vision (ICCV). pp. 7908-7917. IEEE, Seoul, Korea (South) (Oct. 2019). https://doi.org/10.1109/ICCV.2019.00800 [doi.org], https://ieeexplore.ieee.org/ [ieeexplore.ieee.org] document/9009520/ 6.

Hao, Z., Li, Y., You, S., Lu, F.: Detail Preserving Depth Estimation from a Single Image Using Attention Guided Networks. arXiv:1809.00646 [cs] (Sep. 2018), http://arxiv.org/abs/1809.00646, arXiv: 1809.00646 3.

Lee, J., Gupta, M.: Blocks-World Cameras. In: 2021 IEEE/CVF Conference on Computer Vision and Pattern Recognition (CVPR). pp. 11407-11417. IEEE, Nashville, TN, USA (Jun. 2021). https://doi.org/10.1109/CVPR46437.2021.01125 [doi.org], https://ieeexplore.ieee.org/document/9578739/ [ieeexplore.ieee.org] 7.

Lee, J.H., Han, M.K., Ko, D.W., Suh, I.H.: From Big to Small: Multi-Scale Local Planar Guidance for Monocular Depth Estimation. arXiv:1907.10326 [cs] (Mar. 2020), http://arxiv.org/abs/1907.10326 [arxiv.org], arXiv: 1907.10326 version: 5 12.

Lindell, D.B., O'Toole, M., Wetzstein, G.: Single-photon 3D imaging with deep sensor fusion. ACM Transactions on Graphics 37(4), 113:1-113:12(Jul. 2018). https://doi.org/10.1145/3197517.3201316 [doi.org], https://doi.org/10.1145/ [doi.org] 3197517.3201316 4.

Nishimura, M., Lindell, D.B., Metzler, C., Wetzstein, G.: Disambiguating Monocular Depth Estimation with a Single Transient. European Conference on Computer Vision (ECCV) (2020) 4.

O'Toole, M., Heide, F., Lindell, D.B., Zang, K., Diamond, S., Wetzstein, G.: Reconstructing Transient Images from Single-Photon Sensors. In: 2017 IEEE Conference on Computer Vision and Pattern Recognition (CVPR). pp. 2289-2297 (Jul. 2017). https://doi.org/10.1109/CVPR.2017.246 [doi.org], ISSN: 1063-6919 6.

Ranftl, R., Bochkovskiy, A., Koltun, V.: Vision Transformers for Dense Prediction. arXiv:2103.13413 [cs] (Mar. 2021), http://arxiv.org/abs/2103.13413 [arxiv.org], arXiv:2103.13413 3, 11, 12.

Tsai, C.Y., Kutulakos, K.N., Narasimhan, S.G., Sankaranarayanan, A.C.: The Geometry of First-Returning Photons for Non-Line-of-Sight Imaging. In: 2017 IEEE Conference on Computer Vision and Pattern Recognition (CVPR). pp. 2336-2344 (Jul. 2017). https://doi.org/10.1109/CVPR.2017.251 [doi.org], iSSN: 1063-6919 4.

Xin, S., Nousias, S., Kutulakos, K.N., Sankaranarayanan, A.C., Narasimhan, S.G., Gkioulekas, I.: A Theory of Fermat Paths for Non-Line-of-Sight Shape Reconstruction. In: 2019 IEEE/CVF Conference on Computer Vision and Pattern Recognition (CVPR). pp. 6793-6802. IEEE, Long Beach, CA, USA (Jun. 2019). https://doi.org/10.1109/CVPR.2019.00696 [doi.org], https://ieeexplore [ieeexplore].ieee.org/document/8954312/ 4.

* cited by examiner

500

| Grid Size | Method | $\delta < 1.05^1 \uparrow$ | $\delta < 1.05^2 \uparrow$ | $\delta < 1.05^3 \uparrow$ | $\delta < 1.25^1 \uparrow$ | $\delta < 1.25^2 \uparrow$ | $\delta < 1.25^3 \uparrow$ | $Log_{10} \downarrow$ | $AbsRel \downarrow$ | $RMSE \downarrow$ |
|---|---|---|---|---|---|---|---|---|---|---|
| 4 × 3 | Described | 0.335 | 0.577 | 0.724 | 0.845 | 0.953 | 0.981 | 0.068 | 0.126 | 0.604 |
| | Baseline | 0.340 | 0.569 | 0.709 | 0.824 | 0.934 | 0.967 | 0.171 | 0.147 | 0.652 |
| | Bilinear | 0.285 | 0.466 | 0.588 | 0.715 | 0.886 | 0.951 | 0.083 | 0.169 | 0.856 |
| 20 × 15 | Described | 0.624 | 0.809 | 0.880 | 0.929 | 0.976 | 0.989 | 0.060 | 0.073 | 0.409 |
| | Baseline | 0.576 | 0.786 | 0.867 | 0.923 | 0.973 | 0.988 | 0.066 | 0.084 | 0.450 |
| | Bilinear | 0.583 | 0.763 | 0.840 | 0.899 | 0.963 | 0.985 | 0.038 | 0.081 | 0.498 |
| | Described Refined | 0.707 | 0.865 | 0.924 | 0.961 | 0.990 | 0.996 | 0.024 | 0.053 | 0.287 |
| MDE | DORN | 0.394 | 0.602 | 0.731 | 0.846 | 0.954 | 0.983 | 0.053 | 0.120 | 0.501 |
| | DenseDepth | 0.311 | 0.548 | 0.706 | 0.847 | 0.973 | 0.994 | 0.053 | 0.123 | 0.461 |
| | BTS-DenseNet | 0.357 | 0.607 | 0.764 | 0.885 | 0.978 | 0.994 | 0.047 | 0.110 | 0.392 |
| | DPT | 0.326 | 0.595 | 0.767 | 0.904 | 0.988 | 0.998 | 0.045 | 0.109 | 0.357 |

FIG. 10

(b) True Depth Map (d) Described Refined (a) RGB Image (c) Bilinear Upsampling

SYSTEMS, METHODS, AND MEDIA FOR ESTIMATING A DEPTH AND ORIENTATION OF A PORTION OF A SCENE USING A SINGLE-PHOTON DETECTOR AND DIFFUSE LIGHT SOURCE

STATEMENT REGARDING FEDERALLY SPONSORED RESEARCH

This invention was made with government support under CNS2107060 awarded by the National Science Foundation. The government has certain rights in the invention.

CROSS-REFERENCE TO RELATED APPLICATIONS

N/A

BACKGROUND

Three-dimensional imaging is increasingly being used to facilitate several technologies such as autonomous navigation, robotic surgery, and augmented reality. One catalyst behind this trend is the emergence of depth sensors that can recover the 3D geometry of a sensors' surroundings. While a full 3D map may be needed for several applications such as industrial inspection and digital modeling, high-resolution 3D geometry may not be required for other scenarios.

Accordingly, new systems, methods, and media for estimating a depth and orientation of a portion of a scene using a single-photon detector and diffuse light source are desirable.

SUMMARY

In accordance with some embodiments of the disclosed subject matter, systems, methods, and media for estimating a depth and orientation of a portion of a scene using a single-photon detector and diffuse light source are provided.

In accordance with some embodiments of the disclosed subject matter, a system for estimating at least one property in a scene is provided, the system comprising: a light source; an image sensor comprising a pixel, wherein the pixel has a field of view of at least one degree; at least one hardware processor that is programmed to: cause the light source to emit a sequence of n defocused pulses toward the scene; receive, from the pixel, information indicative of arrival times of light from the scene; generate a transient histogram using the information indicative of arrival times of light from the scene; and estimate one or more properties of a portion of the scene within the field of view of the pixel based on the transient histogram, wherein the one or more properties of the portion of the scene includes at least a depth.

In some embodiments, the system further comprises a diffuser disposed between the light source and the scene.

In some embodiments, the image sensor includes no more than one pixel.

In some embodiments, the one or more properties of the portion of the scene includes a normal orientation $\theta_n$ of the portion of the scene with respect to an optical axis of the pixel.

In some embodiments, the at least one hardware processor is further programmed to: identify a leading edge of a peak in the transient histogram; estimate a first distance $D_1$ based on the leading edge of the peak in the transient histogram; generate a first estimate of the normal orientation $\theta_n$ based on $D_1$; identify a trailing edge of a peak in the transient histogram; estimate a second distance $D_2$ based on the trailing edge of the peak in the transient histogram; generate a second estimate of the normal orientation $\theta_n$ based on $D_2$; and estimate the normal orientation $\theta_n$ based on the first estimate and the second estimate.

In some embodiments, the at least one hardware processor is further programmed to: estimate a Fourier transform of the transient histogram, $\mathcal{F}(\tilde{\varphi})$, where $\mathcal{F}$ is the Fourier transform and $\tilde{\varphi}$ is the transient histogram; estimate a Fourier transform of a forward rendering model $R(\theta_n, Z_0)$, $\mathcal{F}(R(\theta_n, Z_0))$, where $Z_0$ is a depth of the portion of the scene along the optical axis of the pixel; and solve an optimization problem using gradient decent, wherein the optimization problem is expressed as $$\underset{\theta_n, Z_0}{\text{minimize}} \|\mathcal{F}(R(\theta_n, Z_0)) - F(\tilde{\varphi})\|_2^2,$$

and initial values for $\theta_n$ and $Z_0$ are estimated using a leading edge of a peak in the transient histogram and a trailing edge of the peak in the transient histogram, wherein solving the optimization problem comprises calculating an $\mathcal{L}_2$ norm using k Fourier coefficients for $\mathcal{F}(\tilde{\varphi})$ and $\mathcal{F}(R(\theta_n, Z_0))$, where k is less than all of the Fourier coefficients.

In some embodiments, the pixel comprises a single photon avalanche diode (SPAD), and the information indicative of arrival times of light from the scene comprises a plurality of timestamps each indicative of an arrival time of a single photon at the SPAD.

In some embodiments, the image sensor includes an array comprising a plurality of pixels including the pixel, and wherein the at least one hardware processor is further programmed to: receive, from each of the plurality of pixels, information indicative of arrival times of light from the scene; generate a plurality of transient histograms, each of the plurality of transient histograms corresponding to a pixel of the plurality of pixels; estimate a Fourier transform of each transient histogram of the plurality of transient histograms, yielding a plurality of Fourier coefficients for each transient histogram; provide k Fourier coefficients of each of the plurality of Fourier coefficients as input to a trained machine learning model, wherein the trained machine learning model was trained to generate a depth map; and receive, from the trained machine learning model, a depth map for the scene comprising the one or more properties of the portion of the scene.

In accordance with some embodiments of the disclosed subject matter, a method for estimating at least one property in a scene is provided, the method comprising: causing a light source to emit a sequence of n defocused pulses toward the scene; receiving, from a pixel of an image sensor, information indicative of arrival times of light from the scene, wherein the pixel has a field of video of at least one degree; generating a transient histogram using the information indicative of arrival times of light from the scene; and estimating one or more properties of a portion of the scene within the field of view of the pixel based on the transient histogram, wherein the one or more properties of the portion of the scene includes at least a depth.

In accordance with some embodiments of the disclosed subject matter, a non-transitory computer readable medium containing computer executable instructions that, when executed by a processor, cause the processor to perform a method for estimating at least one property in a scene is provided, the method comprising: causing a light source to emit a sequence of n defocused pulses toward the scene; receiving, from a pixel of an image sensor, information indicative of arrival times of light from the scene, wherein the pixel has a field of video of at least one degree; generating a transient histogram using the information indicative of arrival times of light from the scene; and estimating one or more properties of a portion of the scene within the field of view of the pixel based on the transient histogram, wherein the one or more properties of the portion of the scene includes at least a depth.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 10 shows numerical results using mechanisms described herein and using other techniques.

DETAILED DESCRIPTION

Figure 1A:
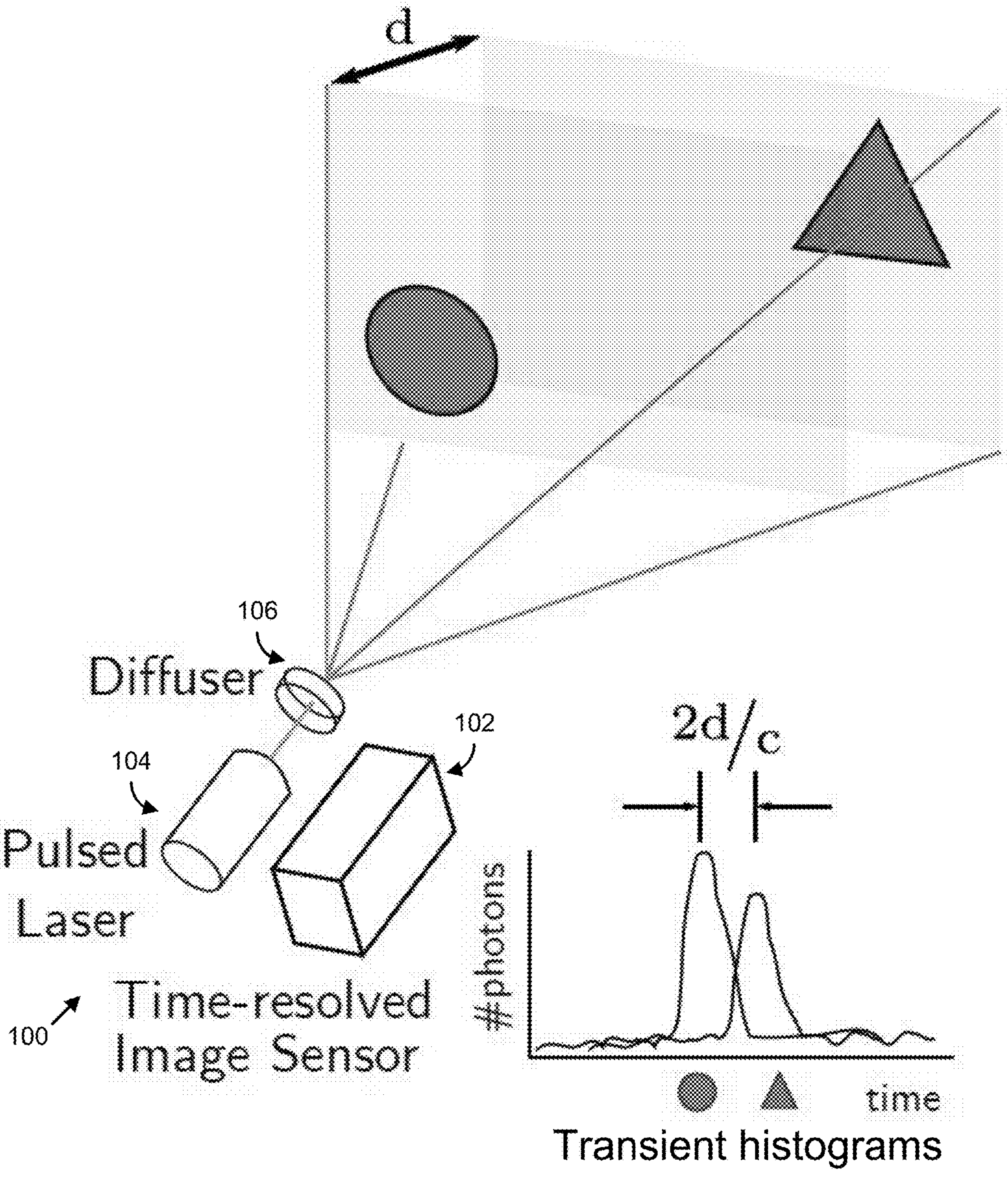
FIG. 1A shows an example setup for estimating a depth and orientation of a portion of a scene using a single-photon detector and diffuse light source in accordance with some embodiments of the disclosed subject matter.

In accordance with various embodiments, mechanisms (which can, for example, include systems, methods, and media) for estimating a depth and orientation of a portion of a scene using a single-photon detector and diffuse light source are provided.

Time resolved image sensors that capture light at pico-to-nanosecond timescales are becoming more mainstream in consumer devices. In some embodiments, mechanisms described herein can be used to implement low cost and/or low power imaging modalities that can capture scene information from minimal time resolved image sensors with as few as one pixel. In some embodiments, mechanisms described herein can illuminate relatively large scene patches (or the entire scene) with a pulsed light source and measure the time-resolved reacted light by integrating over the entire illuminated area (e.g., using as few as one single-photon sensor). Such a one-dimensional measured temporal waveform (which is sometimes referred to herein as a transient), can encode both distance information and albedo information at all visible scene points and as such can be used as an aggregate proxy for the scene's 3D geometry. In some embodiments, mechanisms described herein can utilize information from transient waveforms and, in some embodiments, combined with traditional RGB cameras for recovering scene information. As described below, plane estimation can be performed from a single transient, and using additional transients can facilitate recovery of a depth map of the whole scene. Additionally, as described below, in some embodiments, mechanisms described herein can be used to implement compact, mobile, and/or budget-limited hardware applications.

In some application, such as a robot delivering food on a college campus or a robot arm sorting packages in a warehouse, full 3D perception may be useful or necessary for long-term policy design. However, it often may be unnecessary for time critical tasks such as obstacle avoidance. There is strong evidence that many biological navigation systems such as human drivers do not explicitly recover full 3D geometry for making fast, local decisions such as collision avoidance. For such applications, particularly in resource-constrained scenarios where the vision system is operating under a tight budget (e.g., low-power, low-cost), it can be desirable to use relatively weak 3D cameras which recover lower fidelity 3D scene representations, but with low latency and/or limited power.

In some embodiments, mechanisms described herein can be used to implement a class of weak 3D cameras based on transient histograms, which can be a transient histogram can be implemented as a scene representation tailored for time-critical and resource-constrained applications (e.g., fast robot navigation). In some embodiments, a transient histogram is a one-dimensional signal (e.g., as opposed to 2D images) that can be captured at high speeds and low costs. In some embodiments, mechanisms described herein can be used to implement a weak 3D camera by re-purposing relatively cheap proximity sensors (which are ubiquitous, e.g., used everywhere from commodity devices such as cell phones, to cars, factories, and robots for collision safety). Many of such proximity sensors include a laser source and a fast detector, and are often based on the principle of time of flight (ToF), which can include measuring the time it takes for the light from the laser to hit the scene and bounce back to the sensor.

Conventionally, in a ToF sensor, both the fields of view (FoV) of the laser and that of the detector are configured to coincide and be highly focused (ideally on a single scene point) to ensure that the incoming light has the form of a single pulse corresponding to a single scene point, facilitating its timing. In some embodiments, mechanisms described herein can utilize a different approach. For example, instead of focusing a light source on a relatively narrow region, mechanisms described herein can intentionally diffuse both the laser and the detector, which can cause a relatively large scene patch to be illuminated and detected simultaneously (e.g., information from a large scene patch can be detected by one single-photon detector). In some such embodiments, the incoming wavefront can be composed of the superposition of all scaled and shifted light pulses from all the illuminated scene points. The resulting captured waveform can be referred to herein as the transient histogram or simply a transient. Instead of encoding the depth of a single scene point, a transient can be an aggregate 3D scene representation that encodes information about the 3D geometry and albedos of a relatively large scene patch (up to, in some cases, the entire scene).

In some embodiments, mechanisms described herein can utilize a family of algorithms that can extract scene information, beyond what can be achieved simply via peak-finding, from transients. In some embodiments, mechanisms described herein can utilize algorithms that fall under different categories, including parametric and non-parametric. In some embodiments, for scenes where some prior knowledge can be explicitly modeled, mechanisms described herein can additional recover parameters of the scene. For example, as described below, an analysis by synthesis approach can be used to recover scene parameters for scenes where some prior knowledge can be explicitly modeled. While mechanisms described herein can be used for arbitrary parametric scenes, plane estimation using a hardware prototype that uses a low-cost, off-the-shelf proximity sensor can be implemented (e.g., as described below in connection with FIGS. 3 and 6-8). Additionally, for more complicated scenes, mechanisms described herein can be used to implement learning-based techniques to recover a dense depth map using only a relatively small (e.g., 4×3, 20×15, etc.) array of transients (e.g., captured using an array of single-photon detectors). For example, as described below in connection with FIG. 9, machine-learning techniques can be used to generate a relatively dense depth map using only a relatively small (e.g., 4×3, 20×15, etc.) array of transients. In some embodiments, depth maps generated using mechanisms described herein can be further refined using a 2D color image (e.g., an RGB image).

In some embodiments, mechanisms described herein can be used in resource constrained devices for applications where low fidelity depth representations suffice. In some embodiments, using transient histograms to estimate depth information from a scene can be considered a complementary scene representation that can be recovered with relatively low latency and/or relatively low compute budgets using low cost proximity sensors (e.g., while omitting higher cost sensors).

In general, depth sensing is a classical topic in computer vision with techniques such as stereo, structured light, and time-of-flight which are capable of acquiring high-quality depth maps. While such techniques have made significant progress, such as multi-camera depth estimation, they still face key challenges and/or cannot be used in many applications. For example, in certain applications (e.g., autonomous drones), multiple cameras, complex structured light sensors, and/or bulky LIDARs systems cannot be used due to size, power, and/or cost restrictions. In applications such as these, mechanisms that estimate depth indirectly and/or are less resource-intensive can be advantageous.

Figure 1B:
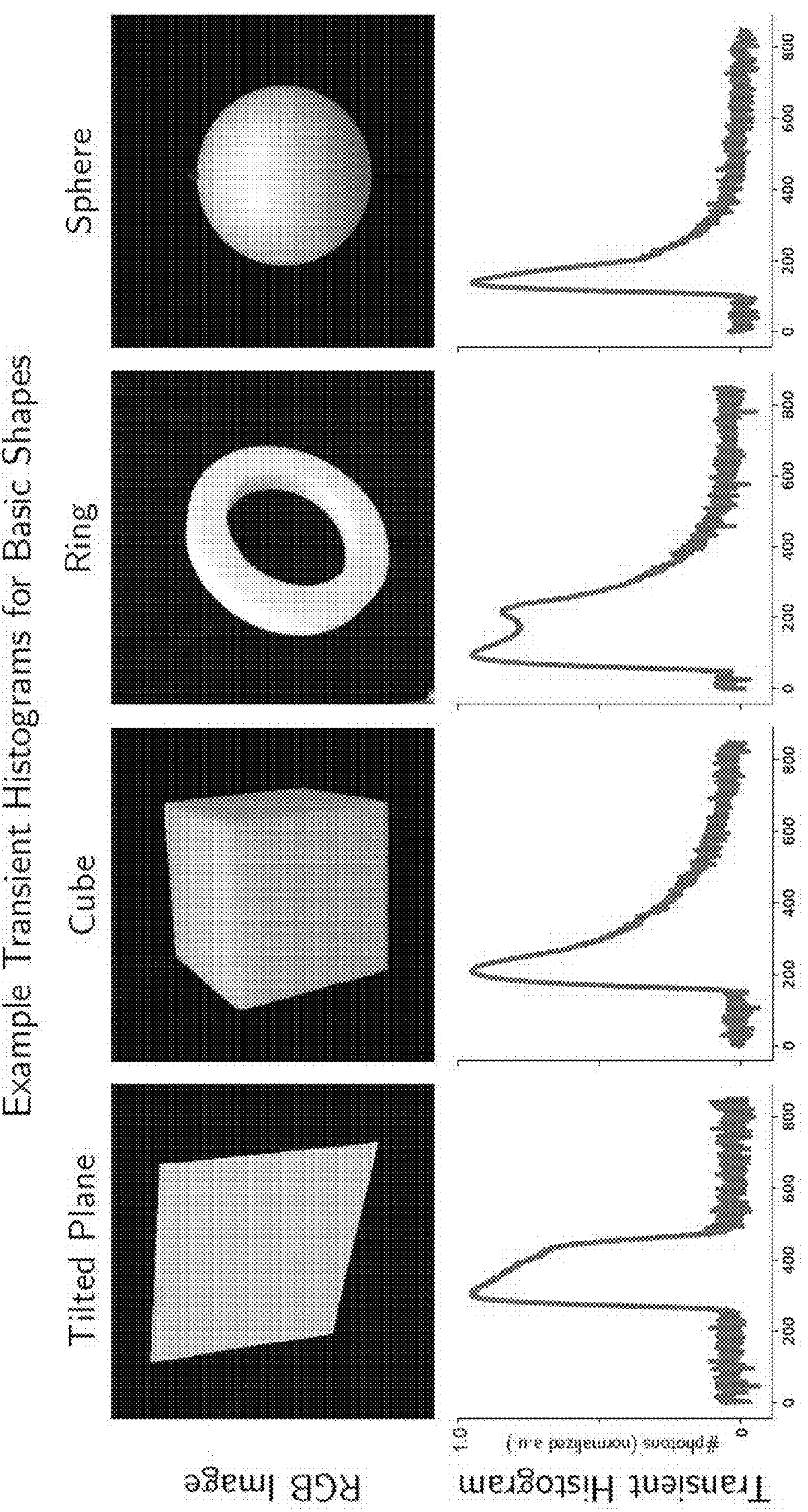
FIG. 1B shows examples of transient histograms obtained using a system for estimating a depth and orientation of a portion of a scene using a single-photon detector and diffuse light source in accordance with some embodiments of the disclosed subject matter.

FIG. 1A shows an example setup for estimating a depth and orientation of a portion of a scene using a single-photon detector and diffuse light source in accordance with some embodiments of the disclosed subject matter. In general, FIG. 1A shows techniques that can be used to measure a transient histogram. For example, as shown in FIG. 1A, measuring a transient histogram can include illuminating a scene with a pulsed illumination, source such as a pulsed laser, which is diffused relatively uniformly over the field of view of a time resolved image sensor pixel, such as a single photon avalanche diode (SPAD). FIG. 1B shows examples of transient histograms obtained using a system for estimating a depth and orientation of a portion of a scene using a single-photon detector and diffuse light source in accordance with some embodiments of the disclosed subject matter. For example, as shown in FIG. 1B, representative examples of different transient histograms obtained with basic 3D shapes are shown. Note that that the histograms shown in FIG. 1B have unique features that capture some information about the shapes.

In some embodiments, an active imaging system 100 can include an image sensor 102 and a light source 104 that can flash illuminate a scene by a periodic pulse train of Dirac delta laser pulses, where each pulse deposits $\Phi_{laser}$ photons into the scene. The light can be relatively uniformly diffused over an illumination cone angle θ. In practice, this can be achieved with a diffuser 106 as shown in FIG. 1A. Using f to denote a repetition frequency of light source 104, the unambiguous depth range $r_{max}$ can be given as $$r_{max} = \frac{c}{2f},$$

where c is the speed of light.

In some embodiments, image sensor 102 can be implemented using a lens-less time-resolved image sensor that includes only a single pixel, and can be co-located with the laser. In some embodiments, image sensor 102 can collect photons returning from the field of view illuminated by the laser source. Using Δ to denote the time resolution of the time-resolved image sensor pixel, which can correspond to a distance resolution of $$\frac{c\Delta}{2},$$

the unambiguous depth range $r_{max}$ can be discretized into $$N = \left\lfloor \frac{1}{f\Delta} \right\rfloor \text{ bins.}$$

In some embodiments, capturing transient histograms with relatively high temporal resolution can generate information that can be used to estimate depth information (and/or other information, such as albedo) about the scene. For example, such a scene representation can benefit from a sensing technology that is fast enough to capture photons on a short timescale (e.g., on a nanosecond to picosecond timescale). In a particular example, in some embodiments, an avalanche photodiode (APD) and a high sampling-rate analog-to-digital converter (ADC) can be used to capture a full transient histogram from a single laser pulse. As another more particular example, a single photon avalanche diode (SPAD) can be used to capture a transient from repeated laser pulses. SPADs have gained popularity in recent years due to their single-photon sensitivity and extreme time resolution, down to hundreds of picoseconds. Additionally, unlike APDs, SPADs can be manufactured at scale using conventional CMOS fabrication technology that has been used in consumer electronics such as mobile devices, and SPADs are becoming increasingly commercially available. As described below in connection with FIGS. 7 and 11, hardware prototypes implemented in accordance with some embodiments of the disclosed subject matter can use SPADs to capture transient histograms.

In some embodiments, a SPAD pixel can be configured to capture at most one returning photon per laser period (e.g., unlike conventional image sensors that capture multiple photons). In general, after each photon detection event, a SPAD pixel enters a dead-time during which the pixel is reset. In many applications, a SPAD pixel can be operated in synchronization with a pulsed light source (e.g., a pulsed laser source), photon timestamps can be acquired over many emission cycles, and a histogram of photon counts can be constructed. This is sometimes be referred herein as a SPAD histogram. In some embodiments, any suitable technique or combination of techniques can be used to estimate a transient histogram of a scene from a measured SPAD histogram.

In each laser cycle, the probability $q_i$ that at least one photon is incident on the SPAD pixel in a time bin i can be calculated using Poisson statistics as: $q_i=1-e^{-\varphi_i}$, where $\varphi_i$ is the quantum efficiency of the SPAD pixel. The probability $p_i$ that the SPAD captures a photon in the $i^{th}$ bin follows a geometric distribution, which can represented as: $p_i=q_i\Pi_{j<i}q_j$. In some embodiments, the $(N+1)^{th}$ SPAD histogram bin can be configured to represent the number of laser cycles with no photon detection, which can be represented as:

$$p_{N+1} = 1 - \Sigma_{i=1}^{N} p_i.$$

If the total incident photon flux is low such that only a small fraction of the laser cycles lead to a photon detection, the expected number of photons measured by the SPAD in bin $1 \leq i \leq N$ is proportional to the transient histogram, which can be represented as: $E[h_i]=L\varphi_i$ where L is the number of laser cycles. Note that this scenario assumes that there is no pile up distortion (e.g., detections of ambient photons before a photon from the light source is detected). In high ambient illumination, existing pile up mitigation techniques such as asynchronous acquisition and statistical post processing can be used to mitigate distortions from pileup. The transient histogram can be approximated as $\tilde{\varphi}_i=h_i/L$. In examples described below, it is generally assumed that that the SPAD pixel captures 512 bins over a 10 meter (m) range corresponding to a time bin resolution of 130 picoseconds (ps).

FIG. 1B shows example histograms for relatively simple shapes, captured experimentally. As shown in FIG. 1B, the different histograms have unique features that correspond to different shapes. Each histogram has a sharp leading edge corresponding to the shortest distance from the sensor to the object. For a 2D tilted plane, the transient histogram also has a sharp trailing edge with a drop-off to zero. The width of the nonzero region (which is sometimes referred to herein as the support of the transient) reveals the difference between the farthest and the nearest point on the object. For 3D shapes like the cube and the sphere, there is no sharp trailing edge, and the dropoff is more gradual. The 3D ring has a double peak, the distance between these peaks is a function of the angle of the plane of the ring with respect to the sensor.

While the leading edge of a transient histogram gives an accurate estimate of the distance to the nearest point on an object, recovering the depth map z(x, y) from a histogram is severely under determined even for very simple shapes, as a transient histogram is an integration of depth, surface normal, and albedo. Physically plausible scenes with different depth maps can produce the same transient histogram.

For example, a source of ambiguity in a transient histogram is albedo-depth ambiguity. In such an example, the height of a peak can conflate albedo and radiometric distance-squared falloff. A small highly reflective (high albedo) object at a given distance can produce an equally strong peak as a larger but more diffuse (low albedo) object.

As another example, a source of ambiguity in a transient histogram is Orientation ambiguity. In such an example, the transient histogram is insensitive to chirality, and a plane tilted at 45° clockwise or counterclockwise with respect to the x-y plane can be expected to produce exactly the same transient histogram.

A family of techniques to recover 3D scene information from transient histograms, beyond what can be achieved via simple peak-finding, are described below.

Figure 2:
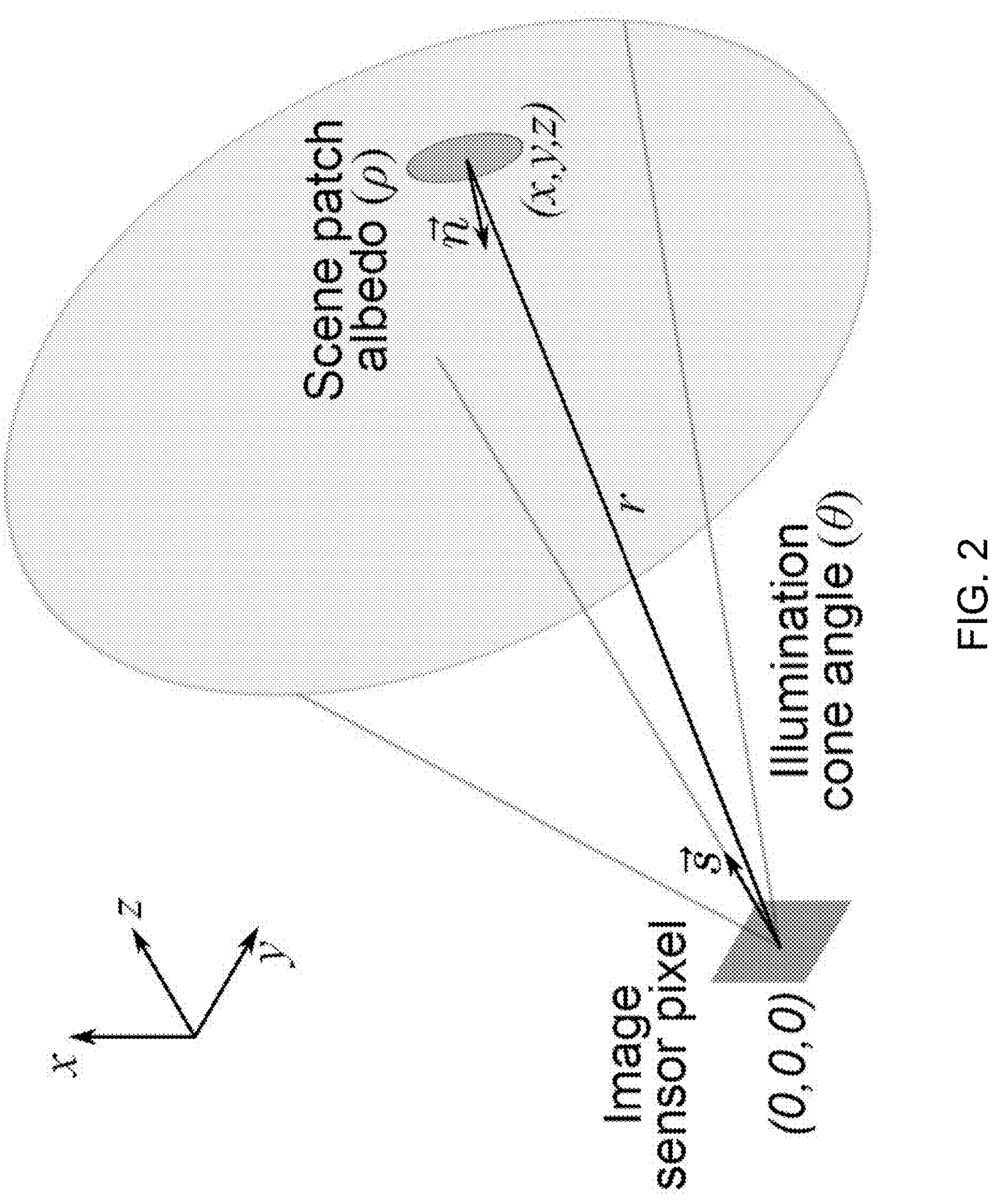
FIG. 2 shows an example representation of a system for estimating a depth and orientation of a portion of a scene and a portion of a scene in accordance with some embodiments of the disclosed subject matter.

FIG. 2 shows an example representation of a system for estimating a depth and orientation of a portion of a scene and a portion of a scene in accordance with some embodiments of the disclosed subject matter. As shown in FIG. 2, a single pixel image sensor can receive light from a scene patch with albedo ρ located at a distance r. The effective albedo can be adjusted according to the cosine of the angle between the normal vectors $\vec{n}$ at the scene patch and $\vec{s}$ at the image sensor pixel. The transient response can be computed by integrating the total light returning from all scene patches located in a range corresponding to the time resolution of the sensor pixel.

FIG. 2 shows an imaging geometry that can be used for deriving a radiometric image formation model, where a 3D coordinate system is fixed with the single pixel sensor at the origin and positive z-axis pointing into the scene. For example, the image sensor pixel can be a SPAD pixel implemented in image sensor 102. The laser source can also co-located at the origin with its direction dened by $\vec{s}$. For the following analysis, it is assumed that the scene is composed of a discrete collection of perfectly Lambertian scene patches. Each visible scene patch has a depth z parametrized by its (x, y) location. Accordingly, the albedo and surface normal of each patch can be given by $\rho(x, y)$ and $\vec{n}(x, y)$. Assuming that there are no inter reflections within the scene and all scene patches that contribute to the signal received by the sensor are inside the unambiguous depth range $0 \leq r := \sqrt{x^2+y^2+[z(x,y)]^2} < r_{max} = c/2f$.

The received laser photon flux vector can include N time bins, and can be represented as $\varphi=(\varphi_1, \varphi_2, \ldots, \varphi_N)$. This vector is sometimes referred to herein as the transient histogram. The photon flux $$\varphi_i^{laser}$$

contributed by the laser illumination for a specific bin i can be given by integrating the light returning from all scene patches that lie in a range of distances satisfying $(i-1)c\Delta/2 \leq r < (i-1)c\Delta/2$.

$$\begin{aligned}\varphi_i^{laser} &= \iint_{(x,y):\frac{(i-1)c\Delta}{2} \leq r < \frac{ic\Delta}{2}} \frac{\rho(x, y)}{4\pi^2(1-\cos(\theta_{fov}/2))r^4} (\vec{n}(x, y) \cdot \vec{s}) \Phi_{laser} dr \\ &= \iint_{(x,y):\frac{(i-1)c\Delta}{2} \leq r < \frac{ic\Delta}{2}} \frac{\hat{\rho}(x, y)}{4\pi^2(1-\cos(\theta_{fov}/2))r^4} \Phi_{laser} dr\end{aligned}$$

where $\hat{\rho}$ is the cosine-angle adjusted albedo of the scene patch, $\vec{n}(x, y)$ is the surface normal of the scene patch, $\vec{s}$ is the source normal, and $\Phi_{laser}$ is the number of photons in each laser pulse.

In some embodiments, the final transient histogram at bin i can be represented as:

$$\varphi_i = \varphi_i^{laser} + \varphi^{bkg} \tag{1}$$

where the constant background component $\varphi^{bkg}$ includes the ambient photon flux (e.g., sunlight, light from indoor lighting, etc.) and internal sensor noise (e.g., due to dark current). A transient histogram can be considered to form a scene representation that integrates scene depth, surface normal, and surface albedo into a one dimensional (1D) signal, further affected by ambient light and sensor noise. Note that this is different than a transient scene response, which is acquired at each (x, y) location (e.g., with a single pixel sensor and a scanning mirror or, or a sensor pixel array) whereas a transient histogram integrates over multiple patches.

Figure 3:
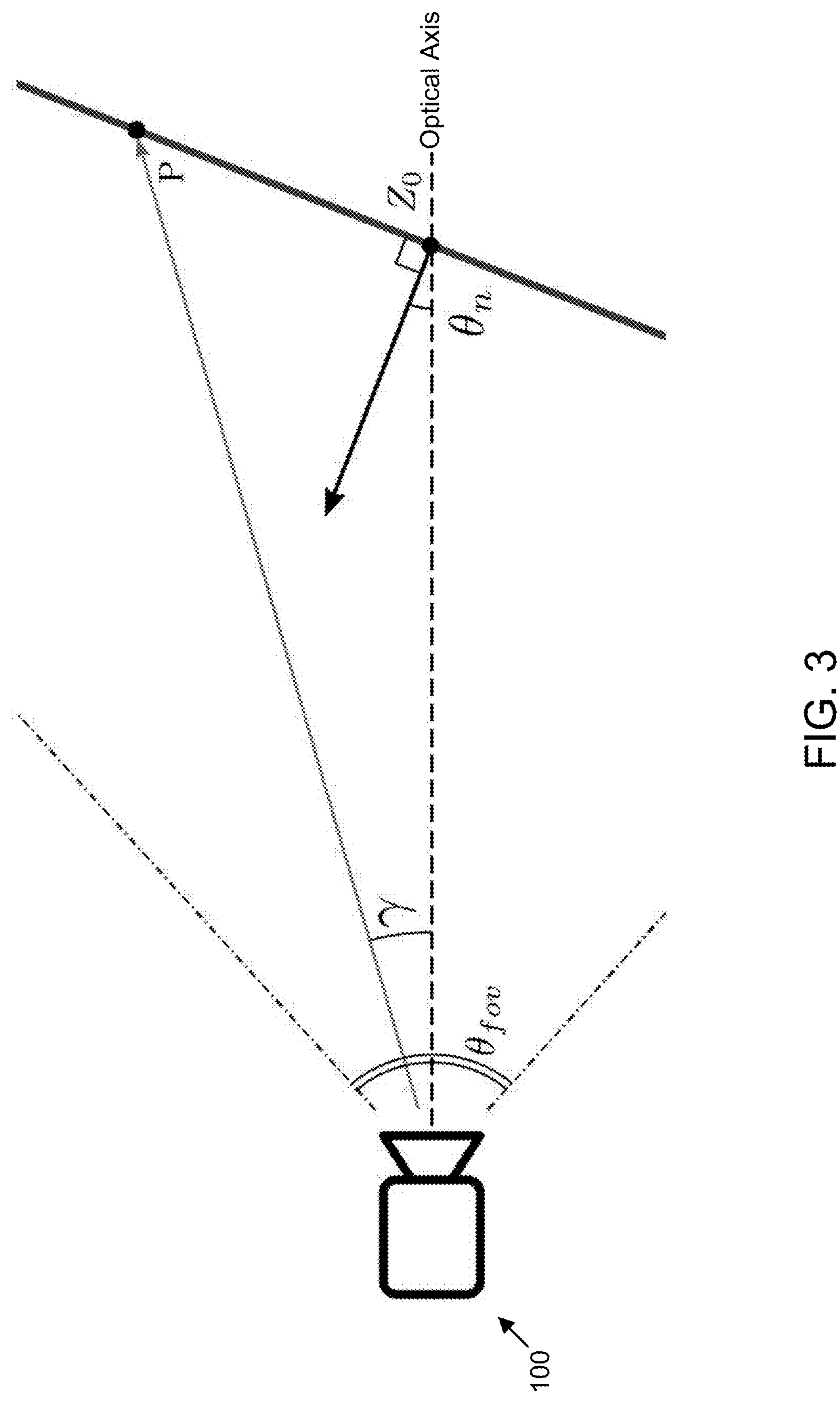
FIG. 3 shows another example representation of a system for estimating a depth and orientation of a portion of a scene and a portion of a scene in accordance with some embodiments of the disclosed subject matter.

FIG. 3 shows another example representation of a system for estimating a depth and orientation of a portion of a scene and a portion of a scene in accordance with some embodiments of the disclosed subject matter. As shown in FIG. 3, a planar scene can be parameterized by its distance $Z_0$ from an image sensor (e.g., image sensor 102) of an imaging system (e.g., imaging system 100) and its normal orientation $\theta_n$ as compared to the optical axis.

The description below in connection with FIG. 3 is related to recovering parameters of a planar scene from a captured transient. Descriptions of recovering parameters of a planar scene from a captured transient this provide insights on estimating more complex 3D geometry (e.g., piecewise planar scenes, and other parametric shapes).

A plane can be parameterized by its normal as given in spherical coordinates, which can be represented as: $\vec{n}=[1, \theta_n, \varphi_n]^T$, and the distance, $Z_0$, at which the plane intercepts the sensor's optical axis (e.g., as shown in FIG. 3). Due to rotational symmetry, it is not possible to recover the azimuthal angle $\phi_n$ from a single transient, and the description below focuses on estimating $\theta_n$ and $Z_0$.

For relatively small fields of view (FOVs) (e.g., 10 degrees or less), $Z_0$ can be directly estimated by finding the location of the largest peak in the transient. This estimator can be expected to becomes less accurate as the size of the FoV increases, but in practice, this decay can be neglected. Additionally or alternatively, a potentially more accurate estimate can be derived from the center of the transient's support. In some embodiments, the diagram in FIG. 3 can be used to derive an estimate of $\theta_n$. The distance to a point on the plane P at a viewing angle $\gamma$, as measured from the optical axis, can be represented as $$\|P\| = Z_0 \frac{\cos(\theta_n)}{\cos(\gamma + \theta_n)}. \tag{2}$$

Note that EQ. (2) reaches its extrema at $\pm\theta_{fov}/2$, corresponding to the furthest and closest scene points, respectively. These extremes can be directly estimated from the transient by detecting the leading and lagging edges of the peak from the 1D signal. This can yield two new distances denoted $D_1$, $D_2$, which each gives an estimate of $\theta_n$ by EQ. (2). Averaging these two estimates can yield a final estimate for $\theta_n$. While such an estimator only relies on basic peak finding primitives, it may fail for relatively large values of $Z_0$ and $\theta_n$ when the lagging edge of the peak falls outside the unambiguous depth range. Note that the results can be expected to be the same if the orientation of plane P were reflected over the optical axis (or otherwise rotated around the optical axis).

Figure 4:
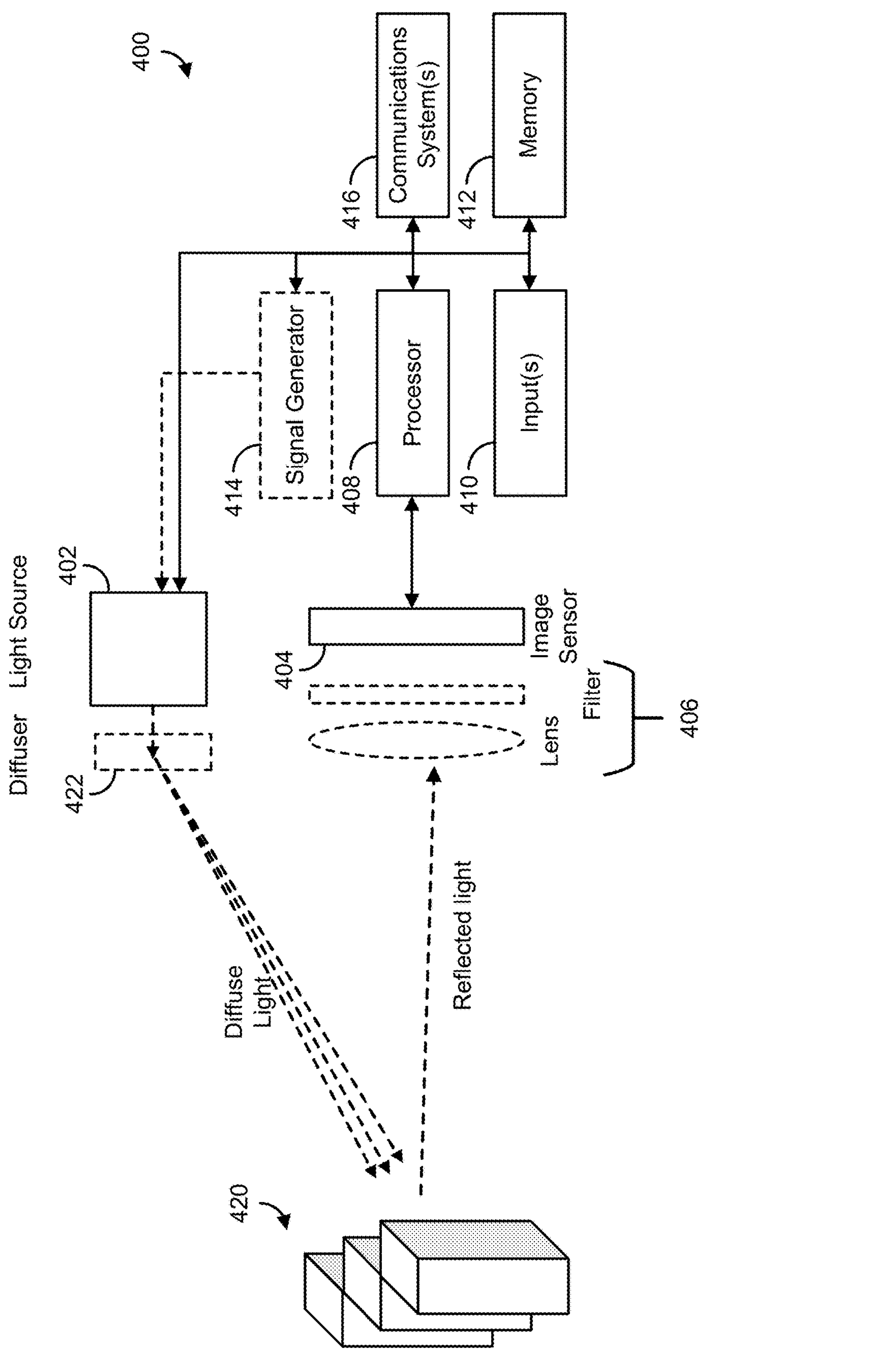
FIG. 4 shows an example of a system for estimating a depth and orientation of a portion of a scene using a single-photon detector and diffuse light source in accordance with some embodiments of the disclosed subject matter.

FIG. 4 shows an example 400 of a system for estimating a depth and orientation of a portion of a scene using a single-photon detector and diffuse light source in accordance with some embodiments of the disclosed subject matter. As shown in FIG. 4, system 400 can include a light source 402; an image sensor 404; optics 406 (which can include, for example, a lens, a filter, a diffuser, etc.) which can cause one or more pixels of image sensor 404 to have a relatively wide field of view (e.g., at least 1 degree, up to 10 degrees, up to 25 degrees, etc.); a processor 408 for controlling operations of system 400 which can include any suitable hardware processor (e.g., a central processing unit (CPU), a graphics processing unit (GPU), an accelerated processing unit (APU), a microprocessor, a digital signal processor, a microcontroller, an image processor, etc., one or more of which can be implemented using a field programmable gate array (FPGA) or an application specific integrated circuit (ASIC), or combination of hardware processors; an input device 410 (such as a shutter button, a menu button, a microphone, a touchscreen, etc.) for accepting input from a user and/or from the environment; memory 412; a signal generator 414 for generating one or more signals for driving light source 402 and/or image sensor 404; a communication system or systems 416 for allowing communication between processor 408 and other devices, such as an automated system (e.g., an automated industrial inspection system, an automated manufacturing system, an autonomous vehicle, etc.), a semi-automated system, a smartphone, a wearable computer, a tablet computer, a laptop computer, a personal computer, a game console, a server, etc., via a communication link; and a diffuser 422 configured to diffuse light emitted by light source 402 along one or more axes of scene 420.

In some embodiments, memory 412 can store time stamps and/or a histogram of timestamps output by image sensor 404, depth values, etc. Memory 412 can include a storage device (e.g., a hard disk, a solid state drive, a Blu-ray disc, a Digital Video Disk (DVD), random access memory (RAM), read-only memory (ROM), electronically erasable programmable read-only memory (EEPROM), etc.) for storing a computer program for controlling processor 408. In some embodiments, memory 412 can include instructions for causing processor 408 to execute processes associated with the mechanisms described herein, such as processes described below in connection with FIG. 5.

In some embodiments, light source 402 can be any suitable light source that can be configured to emit a pulse of light toward a scene 420. In some embodiments, light source 402 can be implemented using any suitable pulsed light source, such as a pulsed laser and/or light emitting diode (LED). In some embodiments, light source 402 can include an array of light sources (e.g., LEDs, laser diodes, etc.) that can be controlled (e.g., individually addressed, addressed by column, etc.) to create a pulse of light that has a relatively uniform intensity across one or more dimensions of scene 420.

In some embodiments, image sensor 404 can include one or more detectors that are capable of capturing information at a high time resolution, such as one or more single-photon detectors (e.g., SPADs), one or more avalanche photodiodes (APDs), one or more jots (e.g., as described in Fossum et al., "The quanta image sensor: Every photon Counts," Sensors, (2016)), etc. For example, image sensor 404 can include a single single-photon detector or an array of multiple single-photon detectors (e.g., SPADs, jots, etc.).

In some embodiments, image sensor 404 can include on-chip processing circuitry that can be used to output a value for each frame (e.g., indicating a time at which a photon was detected, or that a photon was not detected) and/or that can be used to generate a transient on the image sensor, which can be output to processor 408, which can facilitate a reduction in the volume of data transferred from image sensor 404. For example, single-photon detectors of image sensor 404 can be associated with circuitry that implements at least a portion of process 500, described below.

In some embodiments, optics 406 can include optics (e.g., a lens, a diffuser) for focusing light received from scene 420, one or more bandpass filters (e.g., narrow bandpass filters) centered around the wavelength of light emitted by light source 402, one or more neutral density filters, any other suitable optics, and/or any suitable combination thereof. In some embodiments, a single filter can be used for the entire area of image sensor 404 and/or multiple filters can be used that are each associated with a smaller area of image sensor 404 (e.g., with individual pixels or groups of pixels). In some embodiments, optics 406 can be configured to cause one or more pixels of image sensor 404 to have a relatively wide field of view.

In some embodiments, signal generator 414 can be one or more signal generators that can generate signals to control light source 402. As described above in connection with light source 402, in some embodiments, signal generator 414 can generate a signal that indicates when light source 402 is to be activated or not activated.

In some embodiments, system 400 can communicate with a remote device over a network using communication system(s) 416 and a communication link. Additionally or alternatively, system 400 can be included as part of another device, such as an automated system, a semi-automated system, a security system, a smartphone, a tablet computer, a laptop computer, etc. Parts of system 400 can be shared with a device within which system 400 is integrated. For example, if system 400 is integrated with an autonomous vehicle (e.g., an autonomous car) or other autonomous mobile system (e.g., a mobile robot), processor 408 can be a processor of the autonomous system and can be used to control operation of system 400.

In some embodiments, system 400 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as an automated system, a semi-automated system, a digital camera, a security camera, an outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 416 via a communication link can be carried out using any suitable computer network, or any suitable combination of networks, including the Internet, an intranet, a wide-area network (WAN), a local-area network (LAN), a wireless network (e.g., a cellular network), a digital subscriber line (DSL) network, a frame relay network, an asynchronous transfer mode (ATM) network, a virtual private network (VPN). The communications link can include any communication links suitable for communicating data between system 400 and another device, such as a network link, a wireless link, a hard-wired link, a dial-up link, any other suitable communication link, or any suitable combination of such links. System 400 and/or another device (e.g., a server, a personal computer, a smartphone, etc.) can enable a user to execute a computer program that uses information derived using the mechanisms described herein to, for example, identify one or more surfaces in a scene that can be approximated as a portion of a plane.

Note that data received through the communication link or any other communication link(s) can be received from any suitable source. In some embodiments, processor 408 can send and receive data through the communication link or any other communication link(s) using, for example, a transmitter, receiver, transmitter/receiver, transceiver, or any other suitable communication device.

Figure 5:
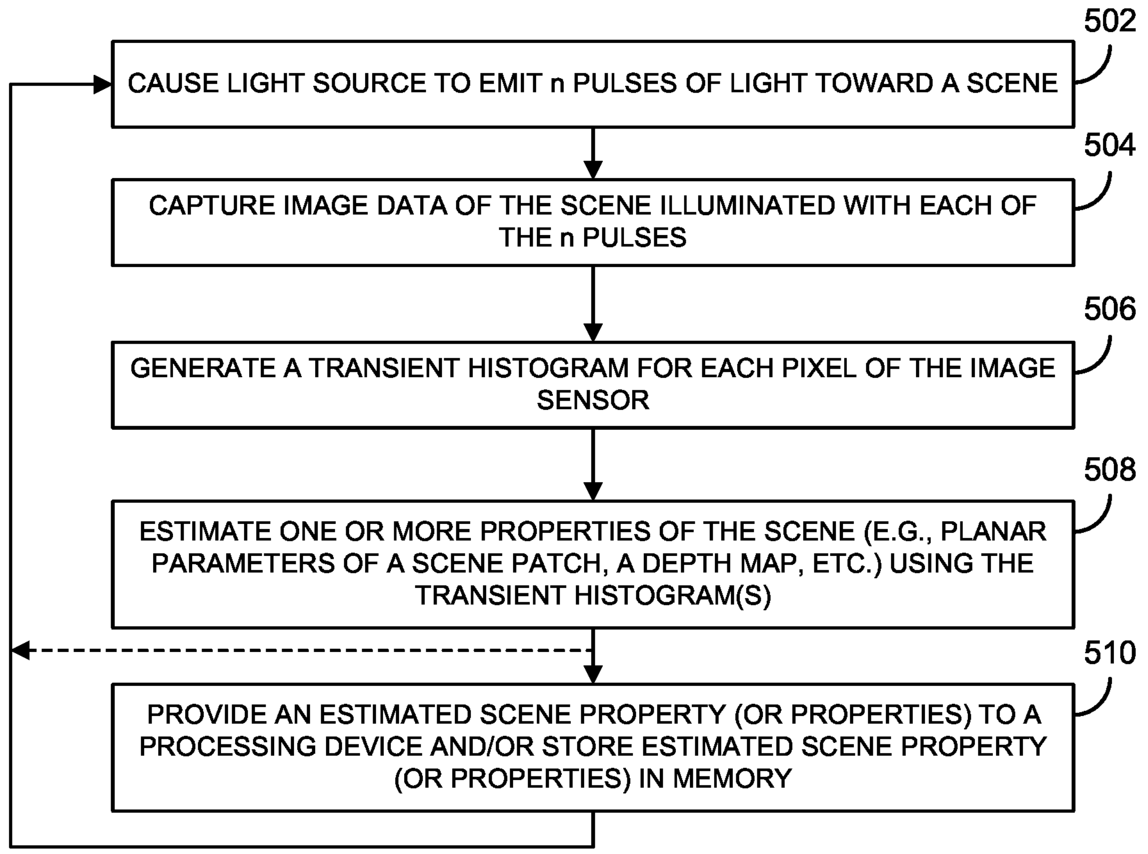
FIG. 5 shows an example of a process for estimating a depth and orientation of a portion of a scene using a single-photon detector and diffuse light source in accordance with some embodiments of the disclosed subject matter.

FIG. 5 shows an example 500 of a process for estimating a depth and orientation of a portion of a scene using a single-photon detector and diffuse light source in accordance with some embodiments of the disclosed subject matter.

At 502, process 500 can cause a light source(s) (e.g., light source 104, light source 402) to emit a series of light pulses (e.g., N light sources) toward a scene. In some embodiments, process 500 can use any suitable technique or combination or techniques to cause the light source(s) to emit the series of light pulses toward the scene. For example, process 500 can utilize a signal generator (e.g., signal generator 414) to periodically (e.g., at regular and/or irregular intervals) cause the light source to emit a pulse of light. In some embodiments, process 500 can cause the light source to emit diffuse light toward the scene. For example, a diffuser can be placed into an optical path between 500 can cause the light source and the scene.

At 504, process 500 can capture image data of the scene illuminated with each of the light pulses emitted at 502. In some embodiments, process 500 can use any suitable technique or combination of techniques to capture image data of the scene. For example, as described above in connection with FIGS. 1A and 4, process 500 can capture a SPAD histogram based on timestamps output by one or more single photon imaging pixels (e.g., implemented using a SPAD, implemented using a jot, using a photomultiplier tube, etc.) using synchronous techniques (e.g., using regular time intervals between laser pulses) or asynchronous techniques (e.g., using techniques described in U.S. Pat. No. 11,448,767, which is hereby incorporated by reference herein in its entirety). As another example, process 500 can capture a histogram based on outputs from a high speed ADC configured to generate a brightness value based on an input analog signal received from an avalanche photo diode (APD), as described above. In such an example, fewer pulses (e.g., as few as one pulses) can be used to capture a histogram.

At 506, process 500 can generate a transient histogram for each pixel using any suitable technique or combination of techniques. For example, for SPAD-based implementations, process 500 can generate the transient histogram from the SPAD histogram. In a more particular example, in a SPAD-based implementation and a scene with relatively low ambient brightness, the transient histogram can be the SPAD histogram. In such an example, 506 can be omitted. As another more particular example, in a SPAD-based implementation and a scene with relatively high ambient brightness, the transient histogram can generate the transient histogram using techniques to correct for pileup, such as using an asynchronous acquisition scheme, using a Coates correction to estimate the transient histogram, etc. In some embodiments, process 500 can include (e.g., prior to causing the light source to emit the N pulses at 502) determining an ambient brightness, and can determine whether to use a synchronous or asynchronous acquisition scheme, an attenuation level (e.g., as described in connection with FIG. 10 of U.S. Pat. No. 11,448,767, which has been incorporated herein by reference).

At 508, process 500 can estimate one or more properties of the scene (e.g., one or more planar properties of a scene patch images by a pixel, a depth map of the scene, etc.) using the transient histogram(s) generated at 506. In some embodiments, process 500 can use any suitable technique or combination of techniques to estimate the one or more scene parameters. For example, process 500 can use techniques described above in connection with FIG. 3 to estimate one or more properties of a planar surface corresponding to a scene patch captured by an imaging pixel that captured the transient histogram.

As another example, process 500 can use techniques described below in connection with FIGS. 6A and 6B to estimate one or more properties of a planar surface corresponding to a scene patch captured by an imaging pixel that captured the transient histogram.

As yet another example, process 500 can use techniques described below in connection with FIG. 9 to estimate a depth map of the scene from a set of transient histograms corresponding to an array of image sensor pixels (e.g., each transient histogram corresponding to a particular image sensor pixel).

At 510, process 500 can provide one or more properties estimated at 508 to a processing device (e.g., a processing device executing process 500, another processing device, etc.) and/or store one or more properties estimated at 508 to memory (e.g., memory 412). For example, in some embodiments, process 500 can provide the one or more properties to processor 408 (e.g., to a cache memory associated with processor 408, to a register, etc.) and/or to another processor (e.g., of a device within which an imaging system executing process 500 is integrated, for example, via communications system 416). In some embodiments, the one or more properties provided at 510 can be used to control movements of a device (e.g., a robot, an autonomous vehicle, etc.).

In some embodiments, process 500 can repeat, and can estimate properties of a dynamic scene over time (e.g., as the image sensor changes position and/or as one or more objects in the scene changes position, one or more objects enters the scene, and/or one or more objects leave the scene).

Figure 6A:
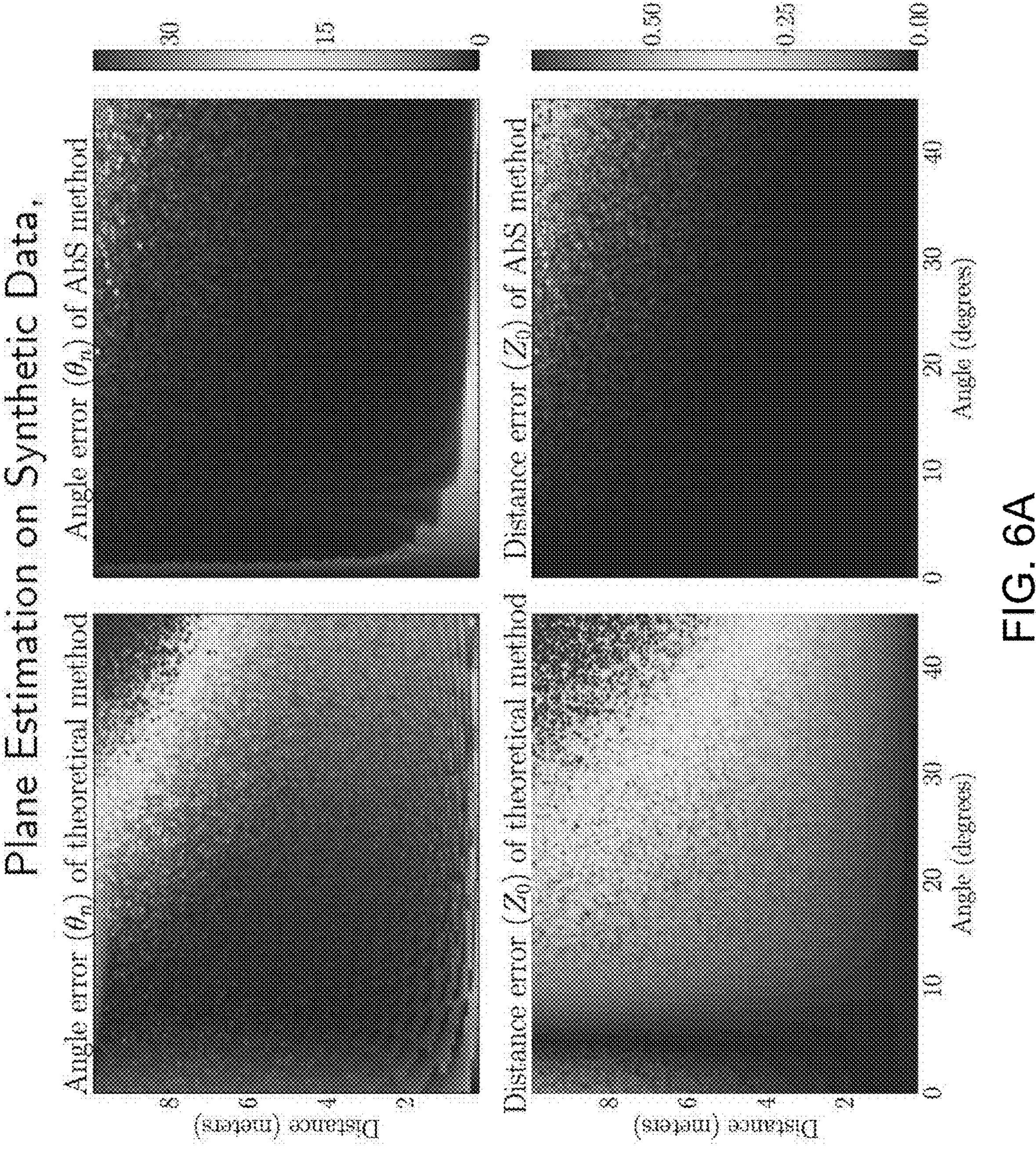
FIG. 6A shows an example of mean average error of estimated plane parameters produced by various approaches over a wide range of parameter combinations on synthetic data, including mean average error generated by a simulated system for estimating a depth and orientation of a portion of a scene implemented in accordance with some embodiments if the disclosed subject matter.

FIG. 6A shows an example of mean average error of estimated plane parameters produced by various approaches over a wide range of parameter combinations on synthetic data, including mean average error generated by a simulated system for estimating a depth and orientation of a portion of a scene implemented in accordance with some embodiments if the disclosed subject matter. FIG. 6A includes an evaluation of mean average error of estimated plane parameters produced by different approaches over a wide range of parameter combinations. The first column in FIG. 6A corresponds to the theoretical approach described above in connection with FIG. 3 and EQ. (2), and the second column corresponds to an analysis-by-synthesis (AbS) approach described below in connection with EQ. (3).

Figure 6B:
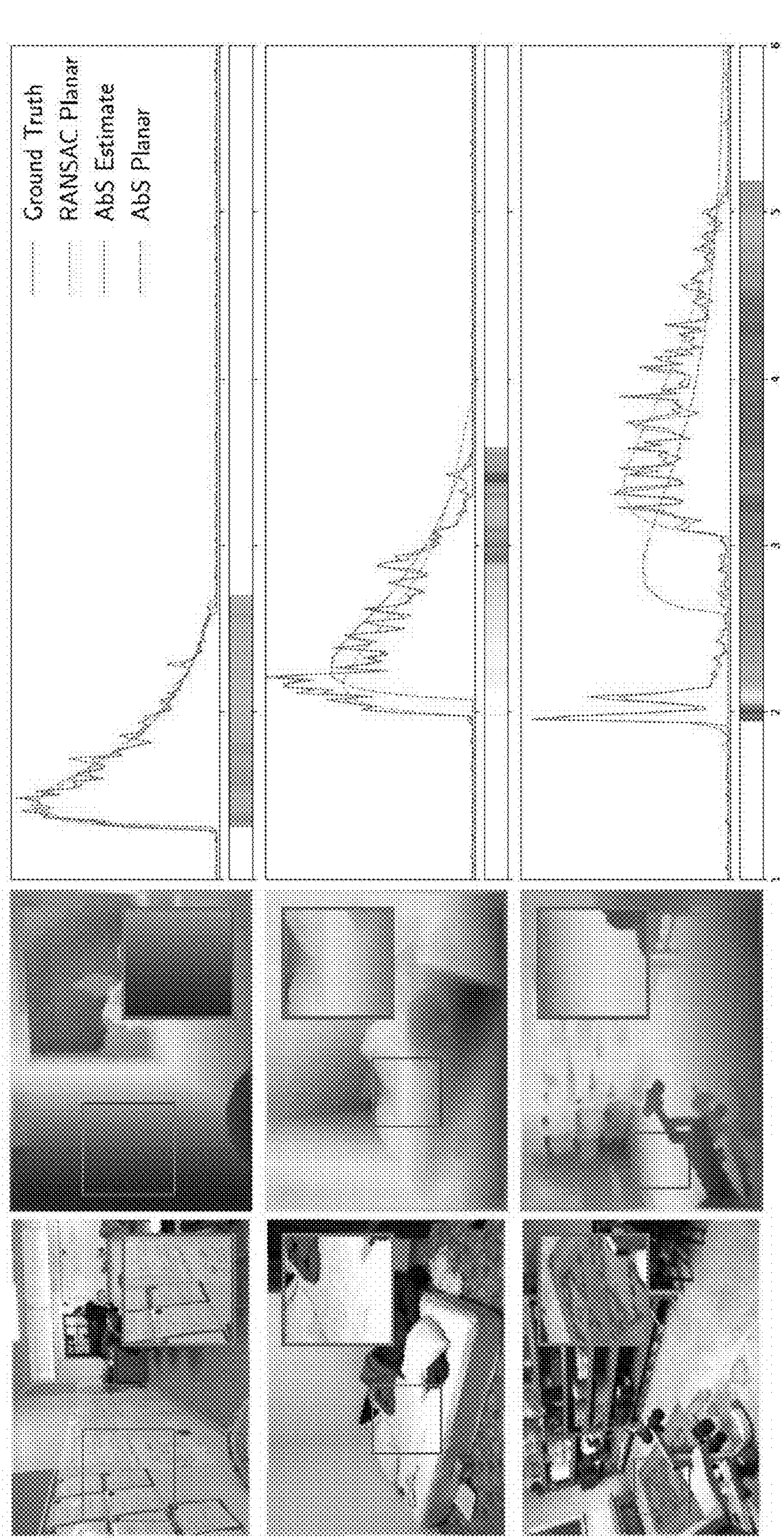
FIG. 6B shows an example of scenes, depths in the scene, and transients produced by a simulated system for estimating a depth and orientation of a portion of a scene implemented in accordance with some embodiments if the disclosed subject matter.

FIG. 6B shows an example of scenes, depths in the scene, and transients produced by a simulated system for estimating a depth and orientation of a portion of a scene implemented in accordance with some embodiments if the disclosed subject matter. FIG. 6B includes transients generated for a few illustrated scene patches of images from the NYUv2 dataset (made available in connection with Kohli et al, "Indoor Segmentation and Support Inference from RGBD Images," ECCV (2012)). In FIG. 6B, solid transients represent simulated ground truth (blue) and the resulting transient produced by the AbS technique (green). Dashed transients correspond to what would be expected observe if the scene patch was perfectly planar with uniform albedo with parameters as estimated by the RANSAC fitting process, and with parameters estimated by the AbS approach (red). Below each transient, the average albedo per bin is shown.

In some embodiments, an analysis-by-synthesis (AbS) technique can be used to estimate scene parameters of a scene patch imaged by an image sensor pixel (e.g., as shown in FIG. 2) that detected diffuse light from the scene. In some embodiments, the AbS-based estimator can further refine the theoretical estimator described above in connection with EQ. (2). In some embodiments, the AbS techniques can include directly optimizing the scene parameters (e.g., $\theta_n$ and $Z_0$) using a differentiable forward rendering model (e.g., $R(\theta_n, Z_0)$) that approximates the image formation defined in EQ. (1) (e.g., the forward rendering model can describe a transient that is expected if the scene parameters are known). In some embodiments, this can include discretizing the integral in $$\varphi_i^{laser}$$

and replacing the transient binning operation with a soft binning process (e.g., replacing sharp rectangular binning with a smooth approximation, such as via a sharp Gaussian kernel), which can facilitate differentiation of the forward rendering model. For example, given a measured transient histogram $$\tilde{\varphi} = \{\varphi_i\}_{i=1}^N,$$

mechanisms described herein can solve the following optimization problem using gradient descent, with the initial solution of $\theta_n$ and $Z_0$ given by the theoretical approach described above in connection with EQ. (2). The optimization problem can be represented as:

$$\underset{\theta_n, Z_0}{\text{minimize}} \|\mathcal{F}(R(\theta_n, Z_0)) - \mathcal{F}(\tilde{\varphi})\|_2^2 \tag{3}$$

where $\mathcal{F}$ denotes the Fourier transform. For example, the $\mathcal{L}_2$ norm can computed on the top k=64 of the 512 complex-valued Fourier coefficients. Such an operation can be equivalent to low pass filtering the signal, removing high-frequency noise. In some embodiments, any suitable technique can be used to estimate the Fourier transform, such as a fast Fourier transform (FFT).

To evaluate the effectiveness of approaches described herein, transients were simulated that correspond to uniform-albedo planes with $Z_0$531 [0,10] meters and $\theta_n \in [0,45]$ degrees. For each transient, plane parameters were using techniques described above in connection with EQ. (2) and the AbS techniques described above, and the results were compared to the ground truth. Results are shown in FIG. 6A. Note that the AbS techniques performed better than the theoretical method 87% of the time for estimating $\theta_n$ and 97% for $Z_0$.

Additionally, transients were simulated with RGB-D Data. A Lambertian scene was assumed, and a scene transient produced under direct illumination was simulated using paired RGB images and depth maps. For each scene, the ground truth transient histogram was generated through Monte Carlo integration. Rays emitted by the light source were sampled, and marched until they hit the scene, and finally the returning signal was weighed by the albedo of the local patch that the ray intersected.

Mechanisms described herein were also tested using images from the NYUv2 dataset, which is a well-known RGB-D dataset. Transient histograms of local patches were simulated, and plane fitting using random sampling and consensus (RANSAC) was performed on the depth map to estimate surface normals of the patches. Results are shown in FIG. 6B.

Figure 7:
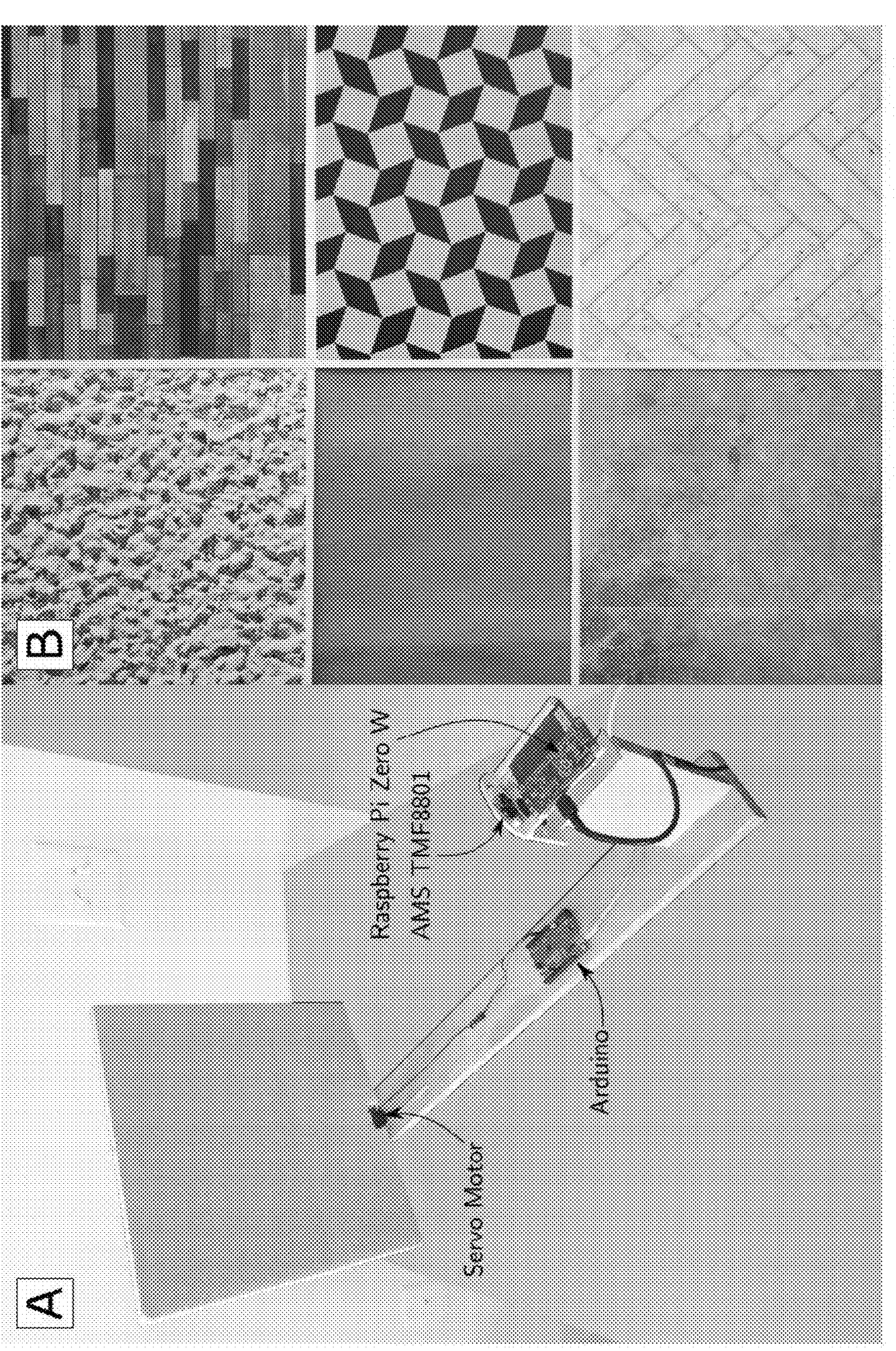
FIG. 7 shows an example implementation of a hardware system for estimating a depth and orientation of a portion of a scene using a single-photon detector and diffuse light source in accordance with some embodiments if the disclosed subject matter, and various scenes with different textures and albedos that were captured using the hardware system.

FIG. 7 shows an example implementation of a hardware system for estimating a depth and orientation of a portion of a scene using a single-photon detector and diffuse light source in accordance with some embodiments if the disclosed subject matter, and various scenes with different textures and albedos that were captured using the hardware system. The prototype shown in FIG. 7, panel (A) represents a relatively low cost device that includes a TMF8801 (available from AMS Osram headquaretered in Premstatten, Austria) time-of-flight sensor that scans a planar scene from different angles. FIG. 7, panel (B) shows a variety of plane textures and albedos that were captured using the prototype shown in FIG. 7, panel (A).

The prototype shown in FIG. 7, panel (A) was built as a low cost hardware prototype using an off the shelf proximity sensor (a TMF8801 sensor available from AMS) costing approximately two dollars, and a Raspberry Pi Zero W mounted on a custom 3D printed mount. As shown in FIG. 7, panel (A), the sensor is attached to a plywood structure and is configured to scan a test plane from different angles, with the angle controlled using a servo motor. The sensor and test plane are at a known distance apart. The plane angle $\theta_n$ was recovered from the transient histograms. Using the servo to rotate the styrofoam backplate to all angles within [−60°, 60°] in increments of 1°, 100 transients were acquired at each angle and with each of the 6 textures shown in FIG. 7, panel (B).

Figure 8:
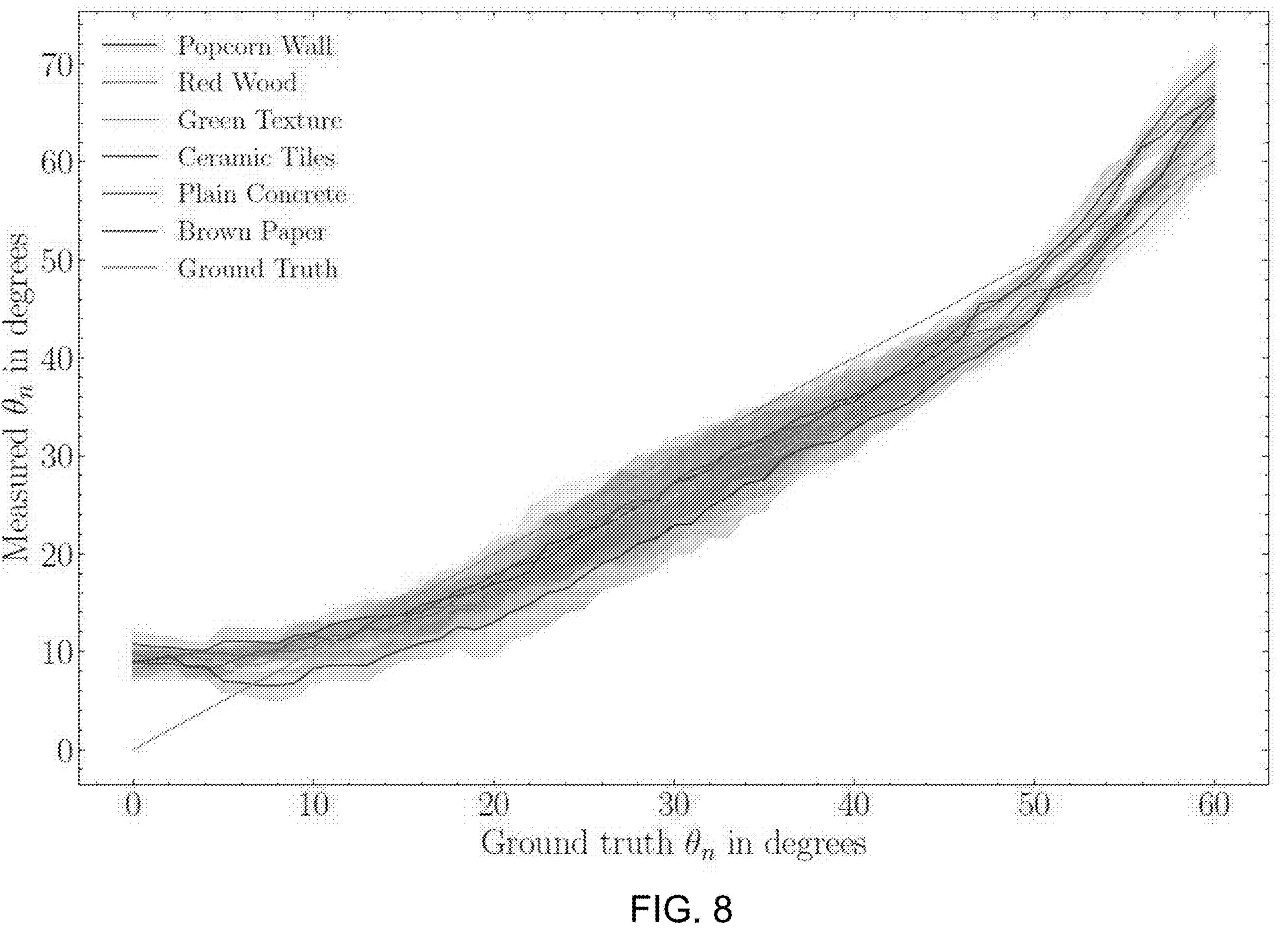
FIG. 8 shows examples of estimated plane parameters using the hardware system and different scenes shown in FIG. 7 in accordance with some embodiments if the disclosed subject matter.

FIG. 8 shows examples of estimated plane parameters using the hardware system and different scenes shown in FIG. 7 in accordance with some embodiments if the disclosed subject matter. In FIG. 8, the mean $\theta_n$ estimate is shown, as well as the standard deviation, for each of the six textures. In line with the simulation results shown in FIG. 6A, the theoretical approach described above in connection with EQ. (2) gives reliable estimates with experimental data over a wide range of angles. Note that the estimates are inaccurate when $\theta_n$ is too small, when the plane is close to perpendicular to the optical axis. Although the theoretical model described in connection with EQ. (2) assumes a Lambertian plane, in practice the techniques are relatively robust to real world albedo variations and can provides reliable estimates even with non Lambertian textured surfaces.

Figure 9:
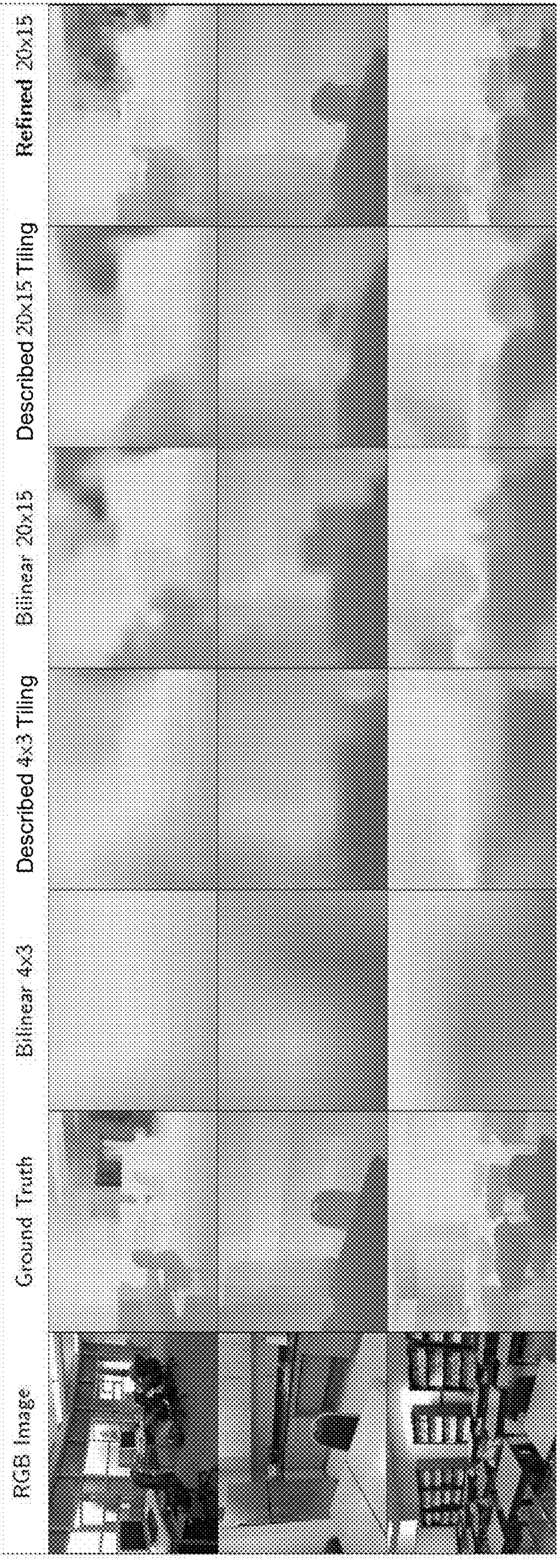
FIG. 9 shows examples of scenes, and depths in the scenes estimated using a simulated system implemented in accordance with some embodiments if the disclosed subject matter.

FIG. 9 shows examples of scenes, and depths in the scenes estimated using a simulated system implemented in accordance with some embodiments if the disclosed subject matter. More particular, FIG. 9 includes simulated depth map results generated from images from the NYUv2 dataset. From left to right, FIG. 9 includes RGB images, a ground truth depth for each image, a bilinear 4×3 upsampling of the depths generated using peak finding in the grid of transients, a depth map generated using a 4×3 tiling technique described below, a bilinear 20×15 upsampling, a depth map generated using a 20×15 tiling technique described below, and the 20×15 tiling technique refined using additional machine learning networks.

In some embodiments, mechanisms described herein can estimate scene depths of a scene with complex scene geometry and albedos, without prior knowledge of the scene's overall shape using transient histograms derived from an array of image sensor pixels. In some embodiments, a deep model can be used to predict a relatively dense depth map from a sparse set of transient histograms. As shown in FIG. 9 and described below, resulting estimated depth maps can be further refined with using an RGB input image in addition to the transient histograms.

In general, recovering complex depth geometries from a single transient histogram is a severely ill posed problem. In some embodiments, mechanisms described herein can use a relatively low spatial resolution 2D array of defocused image sensor pixels (e.g., SPAD pixels) that image sub-regions of the complete FoV. In some embodiments, any suitable array of pixels can be used. For example, results were generated for two configurations: a 4×3 array of SPADs, each with a FoV of 25 degrees, and a 20×15 array of SPADs, each with a FoV of 10 degrees. The specific fields of view were chosen to cover the whole scene in the RGB image with each SPAD's FoV overlapping slightly with each of its neighbors. For an RGB output resolution of 640×480, these arrays correspond to a downsampling ratio of 160× and 32× respectively. Note that as the number of pixels in the array increases, relative advantages provided by an array implemented in accordance with some embodiments of the disclosed subject matter (e.g., increased efficiency, reduced costs) can decrease with respect to other techniques for estimating one or more parameters of a scene.

In some embodiments, any suitable deep convolutional network architecture can be used to implement and train a machine learning model to generate a depth map from transient histograms. In some embodiments, the machine learning model can include repeating blocks of convolutional layers and upsampling layers which are stacked until a desired output resolution is achieved.

In some embodiments, the Fourier transform of each input transient can be calculated, and the top k coefficients can be kept. For example, k=4 was used for the 4×3 grid and k=16 was used for the 20×15 grid. In some embodiments, the machine learning model can be trained using any suitable techniques or combination of techniques. For example, the reverse Hubert "BerHu" loss (e.g., as described in Owen, "A robust hybrid of lasso and ridge regression," in Verducci et al., "Contemporary Mathematics" published by American Mathematical Society (2007) and Zwald et al., "The BerHu penalty and the grouped effect," arXiv:1207.6868 (2012)) can be used to train the machine learning model using ground truth depth maps and depth maps produced by the machine learning model. Additional details related to the machine learning model architecture and training procedures are described in Appendix A, which is hereby incorporated by reference herein in its entirety.

In some embodiments, the machine learning model can include an input for each pixel, and k Fourier coefficients can be provided as input to the machine learning model for each pixel, where each Fourier coefficient is complex. The input can be a four-dimensional tensor, including the two dimensions (e.g., x, y) of the image sensor array, which can each be associated with k coefficients, which can each be a complex value (e.g., having a real and an imaginary component).

In general, estimating depth from a sparse set of SPAD sensors can be expected to be challenging due to the relatively low spatial resolution of the data. In some embodiments, a color image of the scene that includes high frequency spatial information that is lacking in the transients can be captured (e.g., by a conventional image sensor that is located near the sensor used to capture the transients). For example, image sensor 404 can be integrated into a system that includes a conventional digital imaging device (e.g., a CMOS imaging sensor) configured to capture color (e.g., RGB images).

In some embodiments, mechanisms described herein can utilize any suitable technique or combination of techniques to refine depth data generated from transient histograms. For example, mechanisms described herein can use a fast deformable kernel network (FDKN) (e.g., as described in Kim et al., "Deformable Kernel Networks for Joint Image Filtering," International Journal of Computer Vision, 129 (2):579-600 (2021)) that is trained refine a low-resolution depth map given an RGB image. In a more particular example, the DKN model can be configured to super resolve a depth map by at most 16×, beyond which significant performance degradation can be expected. Directly using this network in post processing of the depth map estimated from the transients can improve the resolution of the depth map, but can lead to noticeable artifacts even when fine-tuned.

As another example, mechanisms described herein use a pretrained dense prediction transformer (DPT) model (e.g., as described in Ranftl et al., "Vision Transformers for Dense Prediction," arXiv:2103.13413 (2021)), which can mitigate artifacts in the output of the DKN model. Note that the relatively low absolute depth accuracy of the depth data generated by the DPT model, it can provide high-resolution spatial details.

In some embodiments, a depth map generated by an FDKN model can be used as a guidance image which determines how the depth map generated by DPT is to be deformed. On a tile by tile basis, a scale and shift that minimizes the $\mathcal{L}_2$ loss between the two depth maps can be calculated. In some embodiments, a final depth map with greater spatial detail and higher accuracy than a monocular depth estimation (MDE) can be generated by interpolation the transformation over the whole depth map and applying it to the DPT prediction.

The NYUv2 dataset was used to generate the results in FIG. 9 both because it is widely used as a benchmark and because it is a large indoor dataset that has dense ground truth information. The same training the testing splits described in Kohli et al. "Indoor Segmentation and Support Inference from RGBD Images," ECCV (2012) were used when training the machine learning model.

FIG. 9 shows sample qualitative results generated using mechanisms described herein and various baselines. As seen in the first and last rows, using the trained machine learning model alone can extract more information from a transient than a single depth measurement as regions that are far are properly identified but not present when upsampling. This effect is particularly noticeable for the smaller grid. The last column shows examples of how the depth map looks after our refinement step which adds more spatial details into the depth map.

FIG. 10 shows numerical results using mechanisms described herein and using other techniques. In FIG. 10, numerical results are shown for mechanisms described herein, baselines, and conventional MDE techniques. Note that while MDE approaches can produce highly detailed depth maps, the absolute depth accuracy (in the lower δ metrics) is comparable to what is achievable with a small 4×3 grid, and mechanisms described herein can produce more accurate depth maps overall.

In general monocular depth estimation (MDE) is a relatively low cost depth recovery technique which aims to estimate dense depth maps from a single RGB image. Early works on MDE focused on hand-crafted appearance features such as color, position, and texture. More recent MDE techniques use almost exclusively learning based approaches, including multi-scale deep networks, attention mechanisms, and most recently vision transformers. Despite predicting ordinal depth relatively well and providing a high level of detail, existing MDE techniques cannot resolve the inherent scale ambiguity, resulting in overall low depth accuracy as compared to high precision systems, such as LiDAR.

To quantitatively evaluate results generated using mechanisms described herein, the results are compared to existing techniques using a set of metrics, including Absolute Relative Error (AbsRel), Root Mean Squared E or (RMSE), Average Log Error (Log 10), and Threshold Accuracy (δ<thr). Details of the metrics can be found in Appendix A, which has been incorporated by reference herein.

Previous works considered 1.25, $1.25^2$, and 1.253 as the thresholds for the threshold accuracy which correspond to 25%, 56%, and 95% error. While results are provided for these thresholds, any real world system may need stronger accuracy guarantees to function properly (e.g., it is likely impossible to perform tasks such as navigation or object avoidance if the predicted depth is of low confidence). To address this, and better quantify the gap between LiDARs and MDE-based techniques, three tighter thresholds are also used: 1.05, $1.05^2$, and $1.05^3$.

A relatively simple baseline is to bilinearly upsample the tiled depth as computed via peak finding. A stronger "baseline" was also used that uses a deep network to super-resolve the depth at each tile. The results were also compared to recent MDE techniques for which some metrics were re-computed using the pre-trained models (which were not published in the original papers). The MDE techniques used for comparison are DORN (described in Fu et al., "Deep Original Regression Network for Monocular Depth Estimation," CoRR (2018)), DenseDepth (described in Alhashim et al., "High Quality Monocular Depth Estimation via Transfer Learning," arXiv:1812.11941 (2019)), BTS-DenseNet (Lee et al., "From Big to Small: Multi-Scale Local Planar Guidance for Monocular Depth Estimation," arXiv:1907.10326 (2020)), and DPT (described in Ranftl et al., "Vision Transformers for Dense Prediction," arXiv:2103.13413 (2021)).

The table in FIG. 10 shows quantitative results. As seen in the lower δ metrics, mechanisms described herein for estimating depth maps using transient histograms can provide the most benefits using small grids. A 5% accuracy increase over bilinear in the lowest δ metric is shown for the small grid whereas it only boosts it by 4.1% in the larger grid. Additionally, note that the refinement step increases the 5% accuracy metric by more than 8%, and reaches nearly double the accuracy of some MDE approaches.

Figure 11:
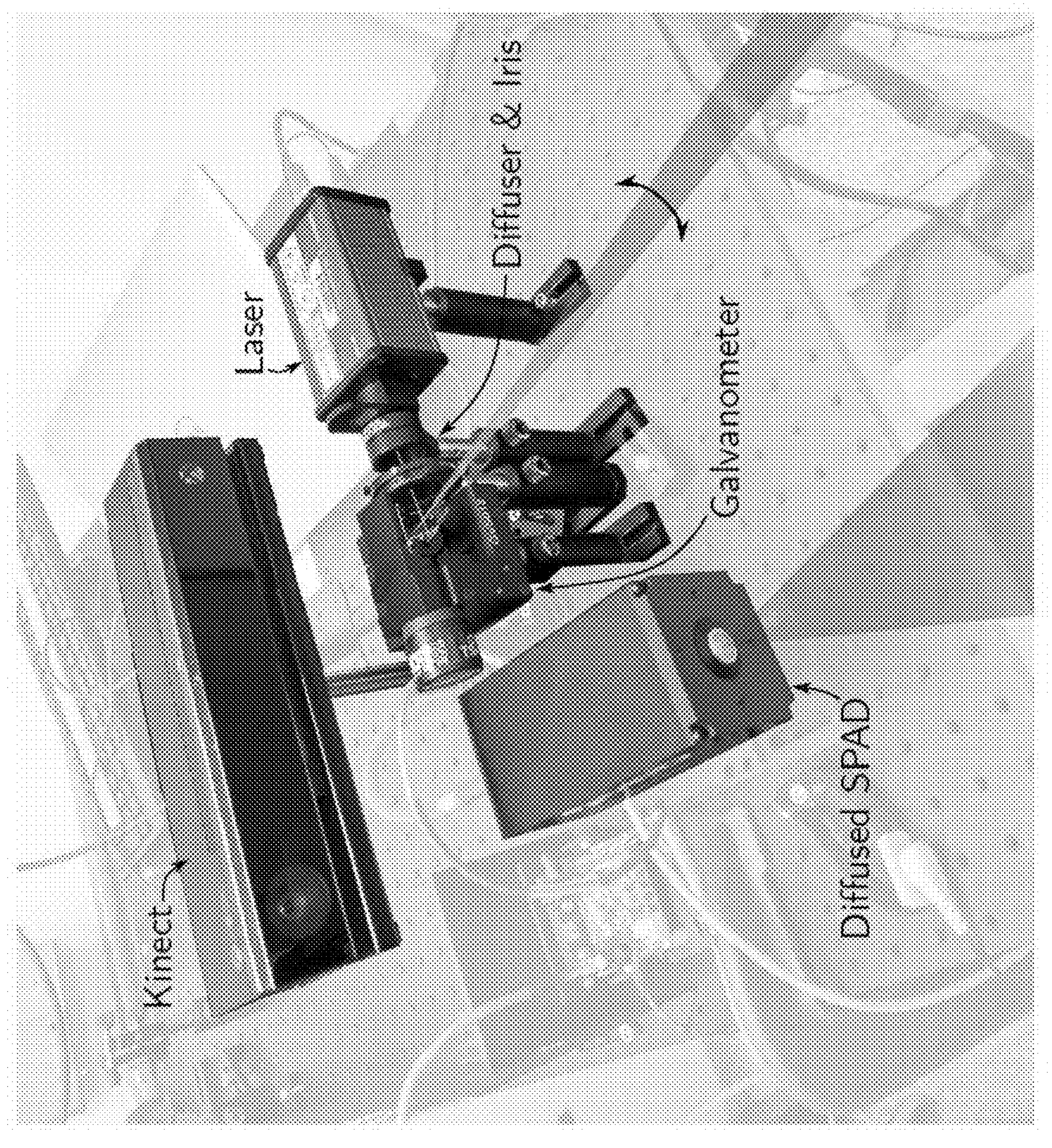
FIG. 11 shows an example of an example implementation of a hardware system for estimating a depth and orientation of a portion of a scene using an array of single-photon detectors and diffuse light source in accordance with some embodiments if the disclosed subject matter, and various scenes with different textures and albedos that were captured using the hardware system.

FIG. 11 shows an example implementation of a hardware system for estimating a depth and orientation of a portion of a scene using an array of single-photon detectors and diffuse light source in accordance with some embodiments if the disclosed subject matter, and various scenes with different textures and albedos that were captured using the hardware system. The prototype shown in FIG. 11 is configured to scan a 20×15 grid in the scene with a diffused laser spot, and a single pixel SPAD detector is used to capture transient histograms. In some embodiments, the scanning mechanism can be omitted, and a low resolution multi pixel SPAD array can be used to simultaneously capture an array of transient histograms.

The prototype in FIG. 11 includes a nanosecond pulsed laser (an NPL52C laser available from Thorlabs, headquartered in Newton, New Jersey, United States) with a 6 ns pulse width, 1.2 watt (W) peak power, and 40 kilohertz (kHz) repetition frequency. The laser spot is diffused and shaped into a 10° cone using a diffuser (an ED1 C20 diffuser from Thorlabs) and an adjustable circular iris. The detector is a lensless singlepixel SPAD detector (a Fast Gated SPAD available from Micro Photon Devices, headquartered in Bolzano, Italy) operated in a gated acquisition mode with a deadtime of 1 microsecond (μs). The field of view of the SPAD pixel covers a whole scene patch. A 2-axis galvanometer (a GVS012 available from Thorlabs) is used to scan a 20×15 grid that covers the complete field of view. Photon timing histograms were acquired using a time-correlated single-photon counting (TCSPC) system (a HydraHarp 400 available from PicoQuant, headquartered in Berlin, Germany) and histograms were constructed offline. A Microsoft Kinect v2 RGB and depth camera was used for capturing intensity and ground-truth depth images.

Figure 12:
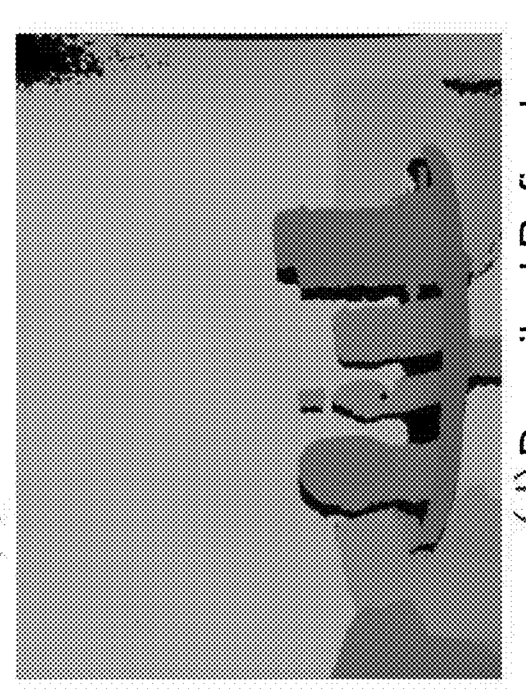
FIG. 12 shows examples of a scene, true depths in the scene, and estimated depths in the scene using the hardware system shown in FIG. 11 and different processing techniques in accordance with some embodiments if the disclosed subject matter.
Figure 12:
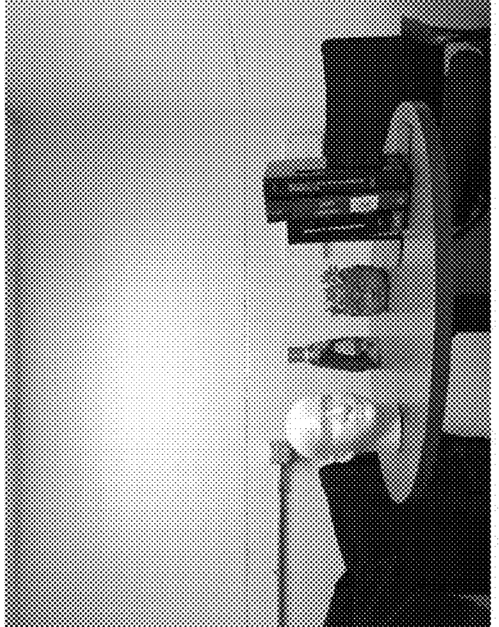
Figure 12:
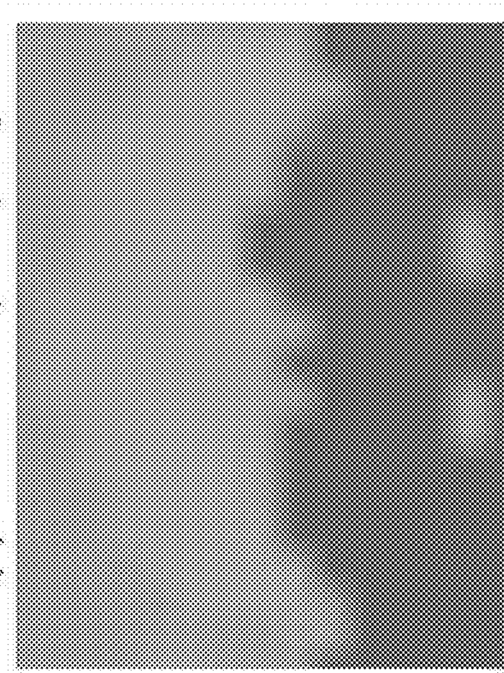

FIG. 12 shows examples of a scene, true depths in the scene, and estimated depths in the scene using the hardware system shown in FIG. 11 and different processing techniques in accordance with some embodiments if the disclosed subject matter. FIG. 12, panel (a) shows a tabletop scene with a wide range of albedos and textured objects that was imaged using the hardware system of FIG. 11. FIG. 12, panel (b) shows a depth map captured using the Kinect v2 system, which is considered a ground truth depth map for comparison. FIG. 12, panel (c) shows results based on bilinear upsampling since the capture is a low resolution 20×15 grid, the simple peak finding based depth map provides no depth details. FIG. 12, panel (d) shows a depth map generated using machine learning techniques described above in connection with FIG. 9, refined using an RGB image captured by the Kinect v2, which generates a relatively high resolution depth map.

The scene shown in FIG. 12, panel (a) is challenging due to several objects with varying reflectance and sharp depth edges. Using bilinear upsampling from the transient peaks results in jagged edges and overall loss of detail. The machine-learning techniques described above in connection with FIG. 9 were able to recover relatively fine details and accurate depths with as few as 20×15 transients. Additional results and comparisons are described in Appendix A, which has been incorporated by reference herein.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIG. 5 can be executed or performed in any suitable order or sequence not limited to the order and sequence shown and described in the figures. Also, some of the above steps of the processes of FIG. 5 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for estimating at least one property in a scene, the system comprising:
a light source;
an image sensor comprising an array comprising a plurality of pixels including a pixel,
wherein each of the plurality of pixels comprises a single photon avalanche diode (SPAD),
wherein the pixel has a field of view of at least one degree, and
wherein the field of view of each of the plurality of pixels in the array overlaps with the field of view of each neighboring pixel;
at least one hardware processor that is programmed to:
cause the light source to emit a sequence of n defocused pulses toward the scene;
receive, from the pixel, information indicative of arrival times of light from the scene,
wherein the information indicative of arrival times of light from the scene comprises a plurality of timestamps each indicative of an arrival time of a single photon at the SPAD of the pixel;
generate a transient histogram using the information indicative of arrival times of light from the scene; and
estimate one or more properties of a portion of the scene within the field of view of the pixel based on the transient histogram, wherein the one or more properties of the portion of the scene includes at least a depth.

2. The system of claim 1, further comprising a diffuser disposed between the light source and the scene.

3. The system of claim 1, wherein the one or more properties of the portion of the scene includes a normal orientation $\theta_n$ of the portion of the scene with respect to an optical axis of the pixel.

4. The system of claim 3, wherein the at least one hardware processor is further programmed to:
identify a leading edge of a peak in the transient histogram;
estimate a first distance $D_1$ based on the leading edge of the peak in the transient histogram;
generate a first estimate of the normal orientation $\theta_n$ based on $D_1$;
identify a trailing edge of a peak in the transient histogram;
estimate a second distance $D_2$ based on the trailing edge of the peak in the transient histogram;
generate a second estimate of the normal orientation $\theta_n$ based on $D_2$; and
estimate the normal orientation $\theta_n$ based on the first estimate and the second estimate.

5. The system of claim 3, wherein the at least one hardware processor is further programmed to:
estimate a Fourier transform of the transient histogram, $\mathcal{F}(\tilde{\varphi})$, where $\mathcal{F}$ is the Fourier transform and $\tilde{\varphi}$ is the transient histogram;
estimate a Fourier transform of a forward rendering model $R(\theta_n, Z_0)$, $\mathcal{F}(R(\theta_n, Z_0))$, where $Z_0$ is a depth of the portion of the scene along the optical axis of the pixel; and
solve an optimization problem using gradient decent, wherein the optimization problem is expressed as:

$$\text{minimize } \|\mathcal{F}(R(\theta_n, Z_0)) - F(\tilde{\varphi})\|_2^2,$$

and initial values for $\theta_n$ and $Z_0$ are estimated using a leading edge of a peak in the transient histogram and a trailing edge of the peak in the transient histogram,
wherein solving the optimization problem comprises calculating an $\mathcal{L}_2$ norm using k Fourier coefficients for $\mathcal{F}(\tilde{\varphi})$ and $\mathcal{F}(R(\theta_n, Z_0))$, where k is less than all the Fourier coefficients.

6. The system of claim 1, wherein the at least one hardware processor is further programmed to:
receive, from each of the plurality of pixels, information indicative of arrival times of light from the scene;
generate a plurality of transient histograms, each of the plurality of transient histograms corresponding to a pixel of the plurality of pixels;
estimate a Fourier transform of each transient histogram of the plurality of transient histograms, yielding a plurality of Fourier coefficients for each transient histogram;
provide k Fourier coefficients of each of the plurality of Fourier coefficients as input to a trained machine learning model, wherein the trained machine learning model was trained to generate a depth map; and
receive, from the trained machine learning model, a depth map for the scene comprising the one or more properties of the portion of the scene.

7. A method for estimating at least one property in a scene, the method comprising:
causing a light source to emit a sequence of n defocused pulses toward the scene;
receiving, from a pixel of an image sensor, information indicative of arrival times of light from the scene,
wherein the image sensor comprises an array comprising a plurality of pixels including the pixel,
wherein each of the plurality of pixels comprises a single photon avalanche diode (SPAD),
wherein the pixel has a field of video of at least one degree,
wherein the field of view of each of the plurality of pixels in the array overlaps with the field of view of each neighboring pixel, and
wherein the information indicative of arrival times of light from the scene comprises a plurality of timestamps each indicative of an arrival time of a single photon at the SPAD of the pixel;
generating a transient histogram using the information indicative of arrival times of light from the scene; and
estimating one or more properties of a portion of the scene within the field of view of the pixel based on the transient histogram, wherein the one or more properties of the portion of the scene includes at least a depth.

8. The method of claim 7, wherein a diffuser disposed between the light source and the scene causes the light emitted by the light source to be defocused.

9. The method of claim 7, wherein the one or more properties of the portion of the scene includes a normal orientation $\theta_n$ of the portion of the scene with respect to an optical axis of the pixel.

10. The method of claim 9, further comprising:

identifying a leading edge of a peak in the transient histogram;

estimating a first distance $D_1$ based on the leading edge of the peak in the transient histogram;

generating a first estimate of the normal orientation $\theta_n$ based on $D_1$;

identifying a trailing edge of a peak in the transient histogram;

estimating a second distance $D_2$ based on the trailing edge of the peak in the transient histogram;

generating a second estimate of the normal orientation $\theta_n$ based on $D_2$; and estimating the normal orientation $\theta_n$ based on the first estimate and the second estimate.

11. The method of claim 9, further comprising:

estimating a Fourier transform of the transient histogram, $\mathcal{F}(\tilde{\varphi})$, where $\mathcal{F}$ is the Fourier transform and $\tilde{\varphi}$ is the transient histogram;

estimating a Fourier transform of a forward rendering model $R(\theta_n, Z_0)$, $\mathscr{F}(R(\theta_n, Z_0))$, where $Z_0$ is a depth of the portion of the scene along the optical axis of the pixel; and solving an optimization problem using gradient decent, wherein the optimization problem is expressed as:

$$\text{minimize } \|\mathcal{F}(R(\theta_n, Z_0)) - F(\tilde{\varphi})\|_2^2,$$

and initial values for $\theta_n$ and $Z_0$ are estimated using a leading edge of a peak in the transient histogram and a trailing edge of the peak in the transient histogram, wherein solving the optimization problem comprises calculating an $\mathcal{L}_2$ norm using k Fourier coefficients for $\mathcal{F}(\tilde{\varphi})$ and $\mathcal{F}(R(\theta_n, Z_0))$, where k is less than all the Fourier coefficients.

12. The method of claim 7, the method further comprising:

receiving, from each of the plurality of pixels, information indicative of arrival times of light from the scene;

generating a plurality of transient histograms, each of the plurality of transient histograms corresponding to a pixel of the plurality of pixels;

estimating a Fourier transform of each transient histogram of the plurality of transient histograms, yielding a plurality of Fourier coefficients for each transient histogram;

providing k Fourier coefficients of each of the plurality of Fourier coefficients as input to a trained machine learning model, wherein the trained machine learning model was trained to generate a depth map; and receiving, from the trained machine learning model, a depth map for the scene comprising the one or more properties of the portion of the scene.

13. A non-transitory computer readable medium containing computer executable instructions that, when executed by a processor, cause the processor to perform a method for estimating at least one property in a scene, the method comprising:

causing a light source to emit a sequence of n defocused pulses toward the scene;

receiving, from a pixel of an image sensor, information indicative of arrival times of light from the scene, wherein the image sensor comprises an array comprising a plurality of pixels including the pixel, wherein each of the plurality of pixels comprises a single photon avalanche diode (SPAD), wherein the pixel has a field of video of at least one degree, wherein the field of view of each of the plurality of pixels in the array overlaps with the field of view of each neighboring pixel, and wherein the information indicative of arrival times of light from the scene comprises a plurality of timestamps each indicative of an arrival time of a single photon at the SPAD of the pixel;

generating a transient histogram using the information indicative of arrival times of light from the scene; and estimating one or more properties of a portion of the scene within the field of view of the pixel based on the transient histogram, wherein the one or more properties of the portion of the scene includes at least a depth.

14. The non-transitory computer readable medium of claim 13, wherein the one or more properties of the portion of the scene includes a normal orientation $\theta_n$ of the portion of the scene with respect to an optical axis of the pixel.

15. The non-transitory computer readable medium of claim 14, wherein the method further comprises:

identifying a leading edge of a peak in the transient histogram;

estimating a first distance $D_1$ based on the leading edge of the peak in the transient histogram;

generating a first estimate of the normal orientation $\theta_n$ based on $D_1$;

identifying a trailing edge of a peak in the transient histogram;

estimating a second distance $D_2$ based on the trailing edge of the peak in the transient histogram;

generating a second estimate of the normal orientation $\theta_n$ based on $D_2$; and estimating the normal orientation $\theta_n$ based on the first estimate and the second estimate.

16. The non-transitory computer readable medium of claim 14, further comprising:

estimating a Fourier transform of a forward rendering model $R(\theta_n, Z_0)$, $\mathscr{F}(R(\theta_n, Z_0))$, where $Z_0$ is a depth of the portion of the scene along the optical axis of the pixel; and solving an optimization problem using gradient decent, wherein the optimization problem is expressed as:

$$\text{minimize } \|\mathcal{F}(R(\theta_n, Z_0)) - F(\tilde{\varphi})\|_2^2,$$

and initial values for $\theta_n$ and $Z_0$ are estimated using a leading edge of a peak in the transient histogram and a trailing edge of the peak in the transient histogram, wherein solving the optimization problem comprises calculating an $\mathcal{L}_2$ norm using k Fourier coefficients for $\mathcal{F}(\tilde{\varphi})$ and $\mathcal{F}(R(\theta_n, Z_0))$, where k is less than all the Fourier coefficients.

17. The non-transitory computer readable medium of claim 13, wherein the method further comprises:

receiving, from each of the plurality of pixels, information indicative of arrival times of light from the scene;

generating a plurality of transient histograms, each of the plurality of transient histograms corresponding to a pixel of the plurality of pixels;

estimating a Fourier transform of each transient histogram of the plurality of transient histograms, yielding a plurality of Fourier coefficients for each transient histogram;

providing k Fourier coefficients of each of the plurality of Fourier coefficients as input to a trained machine learning model, wherein the trained machine learning model was trained to generate a depth map; and receiving, from the trained machine learning model, a depth map for the scene comprising the one or more properties of the portion of the scene.

* * * * *